United States Patent
Cho et al.

(10) Patent No.: US 8,724,566 B2
(45) Date of Patent: May 13, 2014

(54) METHOD OF RANDOM ACCESS IN A WIRELESS SYSTEM

(75) Inventors: Hee Jeong Cho, Anyang-si (KR); Ki Seon Ryu, Anyang-si (KR); Su Nam Kim, Anyang-si (KR); Yong Ho Kim, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 63 days.

(21) Appl. No.: 13/147,582

(22) PCT Filed: Feb. 1, 2010

(86) PCT No.: PCT/KR2010/000595
§ 371 (c)(1),
(2), (4) Date: Aug. 2, 2011

(87) PCT Pub. No.: WO2010/090420
PCT Pub. Date: Aug. 12, 2010

(65) Prior Publication Data
US 2011/0286420 A1 Nov. 24, 2011

Related U.S. Application Data

(60) Provisional application No. 61/175,060, filed on May 4, 2009, provisional application No. 61/168,203, filed on Apr. 9, 2009, provisional application No. 61/167,834, filed on Apr. 8, 2009, provisional application No. 61/167,161, filed on Apr. 7, 2009, provisional application No. 61/149,343, filed on Feb. 3, 2009.

(30) Foreign Application Priority Data

Jul. 24, 2009 (KR) .................. 10-2009-0067794

(51) Int. Cl.
*H04W 4/00* (2009.01)

(52) U.S. Cl.
USPC ........... 370/329; 370/341; 455/450; 455/464; 455/509

(58) Field of Classification Search
USPC ................... 370/329, 341; 455/450–464, 509
See application file for complete search history.

(56) References Cited

U.S. PATENT DOCUMENTS 5,493,569 A 2/1996 Buchholz et al.
2003/0124976 A1 7/2003 Tamaki et al.

(Continued)

FOREIGN PATENT DOCUMENTS

CN 1882159 12/2006
CN 101155395 4/2008

(Continued)

OTHER PUBLICATIONS

Hee Jeong Cho et al., IEEE C802. 16m-08/970r1, Sep. 5, 2008 from Applicant's IDS filed on May 1, 2012.*

(Continued)

*Primary Examiner* — Mark Rinehart
*Assistant Examiner* — Mang Yeung
(74) *Attorney, Agent, or Firm* — Lee, Hong, Degerman, Kang & Waimey

(57) ABSTRACT

A random access method in a wireless communication system is disclosed. The present invention includes transmitting a bandwidth request indicator and a quick access message from a mobile station to a base station and starting a timer having a timer value determined according to an acknowledgement from the base station.

12 Claims, 31 Drawing Sheets

(56) References Cited

U.S. PATENT DOCUMENTS

| | | | |
|---|---|---|---|
| 2005/0054389 A1 | 3/2005 | Lee et al. | |
| 2006/0159015 A1 | 7/2006 | Seo et al. | |
| 2006/0239241 A1 | 10/2006 | Eom et al. | |
| 2007/0201399 A1 | 8/2007 | Lee et al. | |
| 2007/0206531 A1 | 9/2007 | Pajukoski et al. | |
| 2007/0206561 A1 | 9/2007 | Son et al. | |
| 2009/0068944 A1 | 3/2009 | Kang et al. | |
| 2009/0109915 A1 | 4/2009 | Pasad et al. | |
| 2009/0137254 A1 | 5/2009 | Vukovic et al. | |
| 2010/0111029 A1* | 5/2010 | Chou et al. ............ | 370/329 |
| 2011/0176516 A1 | 7/2011 | Thakore et al. | |
| 2011/0286420 A1 | 11/2011 | Cho et al. | |

FOREIGN PATENT DOCUMENTS

| | | |
|---|---|---|
| CN | 101207535 | 6/2008 |
| CN | 101400144 | 4/2009 |
| CN | 100546415 | 9/2009 |
| CN | 102144426 | 8/2011 |
| EP | 1940185 | 7/2008 |
| JP | 8-500227 | 1/1996 |
| JP | 9-083544 | 3/1997 |
| JP | 2002-527967 | 8/2002 |
| JP | 2006-135441 | 5/2006 |
| JP | 2008-510380 | 4/2008 |
| JP | 2008-295014 | 12/2008 |
| KR | 10-2005-0029112 | 3/2005 |
| KR | 10-2005-0052124 | 6/2005 |
| KR | 10-2006-0083935 | 7/2006 |
| KR | 10-0703303 | 4/2007 |
| KR | 10-2007-0065549 | 6/2007 |
| KR | 10-2008-0043471 | 5/2008 |
| KR | 1020080054987 | 6/2008 |
| KR | 1020080063594 | 7/2008 |
| KR | 10-0937432 | 1/2010 |
| KR | 10-0975699 | 8/2010 |
| TW | M354286 | 4/2009 |
| WO | 2008/082908 | 7/2008 |
| WO | 2008/096627 | 8/2008 |
| WO | 2008/115699 | 9/2008 |
| WO | 2008/155931 | 12/2008 |
| WO | 2009/035905 | 3/2009 |

OTHER PUBLICATIONS

Yuan Zhu et al., IEEE C802. 16m-09/0151, Jan. 5, 2009 from Applicant's IDS filed on May 1, 2012.*
H. Cho et al., "Differentiated Random Access Scheme for Bandwidth Request in IEEE 802.16m Systems," IEEE 802.16 Broadband Wireless Access Working Group, IEEE C802.16m-08/970r1, Sep. 2008.
Y. Zhu et al., "Proposed Text Changes to the IEEE 802.16m SDD (802.16m-08/003r6), Section 11.9.2.5 on the Bandwidth Request Channel," IEEE 802.16 Broadband Wireless Access Working Group, IEEE C802.16m-09/0151, Jan. 2009.
M. Okuda et al., "Consecutive Transmission of Bandwidth Request Indicators," IEEE 80216 Broadband Wireless Access Working Group, IEEE C802.16m-08/963, Sep. 2008.
The State Intellectual Property Office of the People's Republic of China Application Serial No. 201080006548.7, Office Action dated Aug. 28, 2013, 6 pages.
The State Intellectual Property Office of the People's Republic of China Application Serial No. 201080006570.1, Office Action dated Jul. 2, 2013, 8 pages.
United States Patent and Trademark Office U.S. Appl. No. 13/147,566, Office Action dated Dec. 20, 2013, 6 pages.
The State Intellectual Property Office of the People's Republic of China Application Serial No. 200980134690.7, Office Action dated Dec. 23, 2013, 5 pages.
United States Patent and Trademark Office U.S. Appl. No. 13/263,329, Office Action dated Jan. 17, 2014, 11 pages.
The State Intellectual Property Office of the People's Republic of China Application Serial No. 201080006548.7, Office Action dated Mar. 18, 2014, 6 pages.

* cited by examiner (a) Case of assigning transmission opportunities by subframe unit (b) Case of assigning transmission opportunities by frame unit Transmission opportunity set (a) < DL/UL ratio 5:3 >

(b) DL/UL ratio 4:4

Indicator ( BR or Ranging )    ACK (a) DL/UL ratio 5:3

(b) DL/UL ratio 4:4

Indicator ( BR or Ranging )     ACK

METHOD OF RANDOM ACCESS IN A WIRELESS SYSTEM

CROSS-REFERENCE TO RELATED APPLICATIONS

This application is a 371 U.S. national stage application of International Application No. PCT/KR2010/000595, filed on Feb. 1, 2010, which claims the benefit of earlier filing date and right of priority to Korean Application No. 10-2009-0067794, filed on Jul. 24, 2009, and also claims the benefit of U.S. Provisional Application Ser. Nos. 61/175,060, filed on May 4, 2009, 61/168,203, filed on Apr. 9, 2009, 61/167,834, filed on Apr. 8, 2009, 61/167,161, filed on Apr. 7, 2009, and 61/149,343, filed on Feb. 3, 2009, the contents of all of which are incorporated by reference herein in their entireties.

TECHNICAL FIELD

The present invention relates to a wireless system, and more particularly, to a method of random access in a wireless communication system.

BACKGROUND ART

First of all, a random access method in a wireless communication system according to a related art is explained with reference to FIG. 1 as follows. FIG. 1 is a diagram for a random aces method in wireless communication system according to a related art.

Referring to FIG. 1, a mobile station selects one of ranging codes from a bandwidth request code (BR code) set to request an uplink bandwidth and then transmits the selected one to a base station [S110]. The mobile station starts a timer after having transmitted the bandwidth request code to the base station. In this case, the timer is a contention-based reservation timeout or a T3.

Having normally received the code transmitted by the mobile station, the base station allocates an uplink resource for sending a bandwidth request (BW-REQ) message to the mobile station [S120]. If the mobile station fails to have the uplink resource allocated thereto until the timer ends after transmission of the bandwidth code, it retransmits the bandwidth code.

The mobile station sends a bandwidth request message via the allocated region [S130]. Having received the bandwidth request message transmitted from the mobile station, the base station allocates an uplink resource to the mobile station [S140]. Subsequently, the mobile station transmits data to the base station via the allocated uplink resource [S150].

In the following description, a random aces method in a future broadband wireless access system is explained with reference to FIG. 2. FIG. 2 is a diagram for a random access method in a future broadband wireless access system.

First of all, in a future broadband wireless access system, a base station simultaneously supports a general 5-step scheme and a 3-step scheme (quick access scheme) both. The 5-step scheme is usable in a manner of being independent from the 3-step scheme or can be used in a 3-step fallback mode.

According to the 3-step scheme, referring to FIG. 2, a mobile station sends a quick access message including a bandwidth request indicator selected randomly or by a pre-determined rule and uplink bandwidth request information to a base station [S210]. In this case, the bandwidth request indicator can be a bandwidth request (BR) sequence or a bandwidth request code. And, the uplink bandwidth request information can include a mobile station ID (station ID), a bandwidth request size and the like.

The base station transmits ACK/NACK (acknowledgement/negative acknowledgement) in response to the bandwidth request indicator to the mobile station [S220]. Having normally received the bandwidth request indicator and the quick access message, the base station allocates an uplink resource for data transmission to the mobile station [S260]. The mobile station then transmits data to the base station via the allocated resource [S270]. In doing so, the mobile station is able to transmit additional uplink bandwidth request information to the base station.

According to the 5-step scheme, if a mobile station transmits a randomly selected bandwidth request indicator to a base station [S210], the base station transmits ACK/NACK to the mobile station in response to the bandwidth request indicator from the mobile station [S220]. The base station allocates an uplink resource for a bandwidth request message transmission to the mobile station via CDMA Allocation A-MAP IE (advanced MAP information element) [S230].

The mobile station sends a bandwidth request message to the base station via the allocated region [S240]. If so, the base station transmits ACK/NACK to the mobile station in response to the bandwidth request message [S250]. The base station allocates an uplink resource to the mobile station via an uplink basic assignment A-MAP IE (UL basic assignment A-MAP IE) [S260]. The mobile station then transmits data to the base station via the allocated region [S270]. In doing so, the mobile station is able to transmit additional uplink bandwidth request information to the base station.

FIG. 3 is a diagram of a ranging process in a wireless communication system according to a related art.

Referring to FIG. 3, in order to perform initial ranging, a mobile station selects one of ranging codes from an initial ranging code set and then transmits the selected ranging code to a base station [S310]. Having normally received the ranging code from the mobile station, the base station allocates an uplink resource for transmitting a ranging request message (Ranging-REQ message) to the mobile station [S320]. According to a temporal status of the ranging code, the base station is able to send a ranging response message (Ranging-RSP message) to the mobile station. If the mobile station fails to receive the uplink resource or the ranging response message until the end of a timer (a content-based reservation timeout or T3), which started after transmission of the ranging code, the mobile station retransmits the ranging code.

The mobile station, to which the uplink resource for sending a ranging request message has bee allocated, sends the ranging request message via the allocated region [S330]. If so, the base station sends a ranging response message to the mobile station [S340]. In this case, the ranging includes handover ranging and periodic ranging as well as the initial ranging.

In the following description, explained are a process for requesting an uplink bandwidth by random access in a future broadband wireless access system and a process for performing a ranging in a future broadband wireless access system.

FIG. 4 is a diagram of a process for requesting an uplink bandwidth in a future broadband wireless access system.

First of all, in a future broadband wireless access system, a base station simultaneously supports a bandwidth request process of a general 5-step scheme and a bandwidth request process of a 3-step scheme (quick access scheme) both. The 5-step scheme is usable in a manner of being independent from the 3-step scheme or can be used in a 3-step fallback mode.

According to the 3-step scheme, referring to FIG. 4, a mobile station sends a quick access message including a bandwidth request indicator selected randomly or by a predetermined rule and uplink bandwidth request information to a base station [S410]. In this case, the bandwidth request indicator can be a bandwidth request (BR) sequence or a bandwidth request code. And, the uplink bandwidth request information can include a mobile station ID (station ID), a bandwidth request size and the like.

The base station transmits ACK/NACK (acknowledgement/negative acknowledgement) in response to the bandwidth request indicator to the mobile station [S420]. Having normally received the bandwidth request indicator and the quick access message, the base station allocates an uplink resource for data transmission to the mobile station [S460]. The mobile station then transmits data to the base station via the allocated resource [S470]. In doing so, the mobile station is able to transmit additional uplink bandwidth request information to the base station.

According to the 5-step scheme, if a mobile station transmits a randomly selected bandwidth request indicator to a base station [S410], the base station transmits ACK/NACK to the mobile station in response to the bandwidth request indicator from the mobile station [S420]. The base station allocates an uplink resource for a bandwidth request message transmission to the mobile station via CDMA Allocation A-MAP IE (advanced MAP information element) [S430].

The mobile station sends a bandwidth request message to the base station via the allocated region [S440]. If so, the base station then allocates an uplink resource to the mobile station via an uplink basic assignment A-MAP IE (UL basic assignment A-MAP IE) [S460]. The mobile station then transmits data to the base station via the allocated region [S470]. In doing so, the mobile station is able to transmit additional uplink bandwidth request information to the base station.

FIG. 5 is a diagram of a process for performing a ranging in a future broadband wireless access system.

Referring to FIG. 5, if a mobile station transmits a ranging indicator to a base station [S510], the base station transmits ACK/NACK to the mobile station in response to the ranging indicator [S520] and allocates an uplink resource for a ranging request message transmission to the mobile station [S530]. If so, the mobile station sends a ranging request message to the base station [S540]. The base station then sends a ranging response message to the mobile station [S550].

As mentioned in the above description, in a broadband wireless access system, a base station receives such a random access code as a bandwidth request indicator and a ranging indicator from a mobile station and then transmits a corresponding ACK/NACK to the mobile station. Therefore, a method of minimizing an overhead of the ACK/NACK is necessary.

DISCLOSURE OF INVENTION

Technical Problem

However, as mentioned in the foregoing description, in the related art, a same resource allocation standby type is applied to all mobile stations. And, a same resource allocation standby time is applied to all data transmitted by one mobile station. Therefore, the related art has a problem that a proper resource allocation standby time is not set according to QoS (quality of service). Moreover, a method of minimizing an overhead of ACK/NACK for a random access code of a mobile station in a broadband wireless access system is necessary. Since a base station is able to transmit ACK/NACK for a quick access message or a bandwidth request message to a mobile station, the mobile station is able to raise efficiency of a wireless system if a random access scheme varies according to the ACK/NACK.

Solution to Problem

Accordingly, the present invention is directed to a method of random access in a wireless communication system that substantially obviates one or more of the problems due to limitations and disadvantages of the related art.

An object of the present invention is to provide a method of transmitting a bandwidth request using a proper resource allocation standby time according to QoS.

Another object of the present invention is to provide method of transmitting a bandwidth request using a proper resource allocation standby time in consideration of a priority of a mobile station.

Another object of the present invention is to provide method of transmitting and receiving ACK/NACK, by which an overhead of ACK/NACK for a random access code of a mobile station can be minimized.

A further object of the present invention is to provide method of random access according to ACK/NACK of a base station in response to a bandwidth request indicator, quick access message or bandwidth request message transmitted by a mobile station.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a random access method of a mobile station in a wireless communication system according to one embodiment of the present invention includes the steps of transmitting a bandwidth request indicator and a quick access message to a base station and starting a timer having a timer value determined according to an acknowledgement from the base station.

Preferably, in the timer starting step, if the acknowledgement indicating that the base station does not receive the bandwidth request indicator or the quick access message is not received from the base station, the mobile station starts the timer having a differentiated value determined according to a characteristic of data to transmit.

More preferably, the mobile station is able to stop the timer if an uplink resource is allocated by the base station.

More preferably, if an uplink resource is not allocated to the mobile station by the base station until the timer expires, the mobile station is able to retransmit the bandwidth request indicator and the quick access message to the base station.

Preferably, in the timer starting step, if the acknowledgement indicating that the base station succeeds in decoding of the bandwidth request indicator but fails in decoding of the quick access message is received from the base station, it is able to start the timer having a default value previously determined between the base station and the mobile station.

More preferably, if an uplink resource is allocated by the base station, the mobile station stops the timer and transmits a bandwidth request message to the base station via the uplink resource. If the acknowledgement indicating that the base station fails to receive the bandwidth request message is not received from the base station, the mobile station is able to start the timer having a differentiated value determined according to a characteristic of data to be transmitted by the mobile station.

In this case, if the uplink resource is not allocated by the base station until the timer having the differentiated value expires, the mobile station is able to retransmit the bandwidth request indicator or the bandwidth request message to the base station.

To further achieve these and other advantages and in accordance with the purpose of the present invention, a random access method of a mobile station in a wireless communication system according to another embodiment of the present invention includes the steps of transmitting a bandwidth request indicator to a base station and if an acknowledgement indicating that the base station fails to receive the bandwidth request indicator is not received from the base station, starting a timer having a default value previously determined between the base station and the mobile station.

To further achieve these and other advantages and in accordance with the purpose of the present invention, in a mobile station of a wireless communication system, a method of performing a bandwidth request procedure using a random access according to another embodiment of the present invention includes the steps of transmitting a first bandwidth request to a base station to request a resource allocation for a data transmission and if there is no response from the base station for a resource allocation standby time determined variably, transmitting a second bandwidth request to the base station.

Preferably, the first resource allocation standby time can be determined according to a QoS level of the data or a priority of the mobile station.

Preferably, the resource allocation standby time can include a resource allocation standby time corresponding to the QoS level of the data in the per-QoS level resource allocation standby time received via a broadcast message or a MAC message.

Preferably, the mobile station receives a per-index resource allocation standby time from the base station via a broadcast message and an index of the resource allocation standby time determined in consideration of the QoS level in the per-index resource allocation standby time by transmitting a MAC message including information on the QoS level of the data to the base station. Therefore, the mobile station is able to use a resource allocation standby time corresponding to the received index as the resource allocation standby time.

Preferably, the mobile station transmits a MAC message including information on the QoS level of the data to the base station and is then able to receive a MAC message including the first resource allocation standby time determined in consideration of the QoS level from the base station.

To further achieve these and other advantages and in accordance with the purpose of the present invention, in a mobile station of a wireless communication system, a method of receiving an acknowledgement (hereinafter abbreviated ACK) according to another embodiment of the present invention includes the steps of transmitting a random access code to a base station via a first resource region and receiving the ACK from the base station via a second resource region temporally spaced apart from the first resource region by an ACK delay.

To further achieve these and other advantages and in accordance with the purpose of the present invention, in a base station of a wireless communication system, a method of transmitting an acknowledgement (hereinafter abbreviated ACK) according to another embodiment of the present invention includes the steps of receiving a random access code from a mobile station via a first resource region and transmitting the ACK to the mobile station via a second resource region temporally spaced apart from the first resource region by an ACK delay.

Preferably, the first resource region is a transmission opportunity including at least one resource unit. And, the transmission opportunity can be assigned to a radio resource by a subframe or frame unit.

Preferably, the ACK delay can be defined by a subframe unit.

Preferably, the ACK delay is defined by a frame unit and the second resource region belongs to a frame spaced apart from a frame having the first resource region belong thereto by the ACK delay.

More preferably, the second resource region can belong to a subframe determined according to a subframe having the first resource region belong thereto within the frame spaced apart from the frame having the first resource region belong thereto.

Preferably, a value of the ACK delay can be transmitted from the base station to the mobile station.

Preferably, a value of the ACK delay can be determined between the mobile station and the base station in advance.

It is to be understood that both the foregoing general description and the following detailed description are exemplary and explanatory and are intended to provide further explanation of the invention as claimed.

Advantageous Effects of Invention

Accordingly, the present invention provides the following effects or advantages.

First of all, the present invention sets a resource allocation standby time to differ according to a QoS level, thereby enhancing QoS.

Secondly, the present invention sets a resource allocation standby time to differ according to a priority of a mobile station, thereby providing a service differentiated according to a mobile station priority.

Thirdly, a base station determines a location for transmitting ACK for a random access code in a manner of informing a mobile station of an ACK delay value in advance or using a predetermined ACK delay value, whereby an overhead of ACK/NACK for the random access code can be minimized.

Fourthly, a mobile station uses a timer value determined according to ACK/NACK of a base station in response to a bandwidth request indicator, quick access message or bandwidth request message transmitted by the mobile station. Therefore, a timer is prevented from starting unnecessarily and a timer value suitable for a situation can be used.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings, to facilitate those having ordinary skill in the art to implement the invention. The present invention can be implemented in various forms, which is non-limited by the following embodiments. To clearly describe the present invention, parts irrespective of the description are omitted from the drawings. Wherever possible, the same reference numbers will be used throughout the drawings to refer to the same or like parts.

Throughout this disclosure, if a prescribed part 'includes' a prescribed element, it means that another element can be further included instead of eliminating other elements as long as absence of special objection. Moreover, such a terminology as 'part' 'unit', 'module' and the like means a unit for handling at least one function or operation, which can be implemented by software, hardware or combination thereof.

First of all, a process for allocating a resource in a wireless communication system according to an embodiment of the present invention is explained with reference to FIG. 6.

Figure 1:
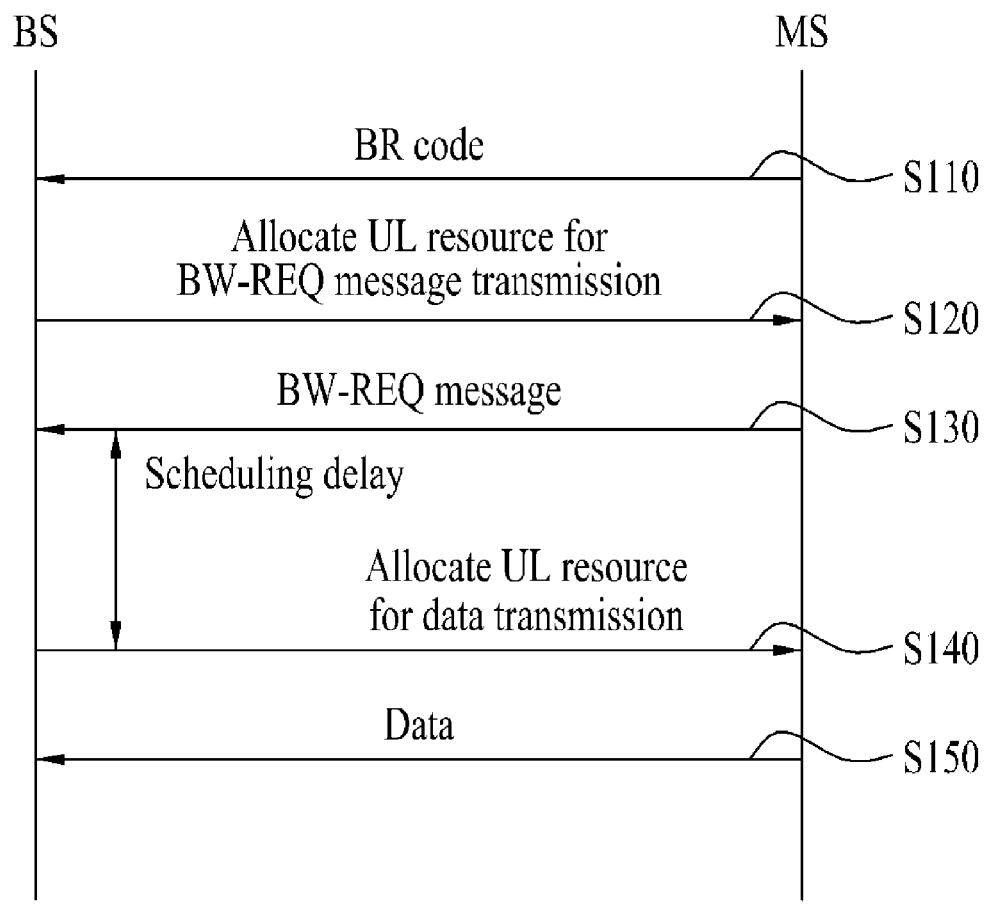
FIG. 1 is a diagram for a random aces method in wireless communication system according to a related art.
Figure 2:
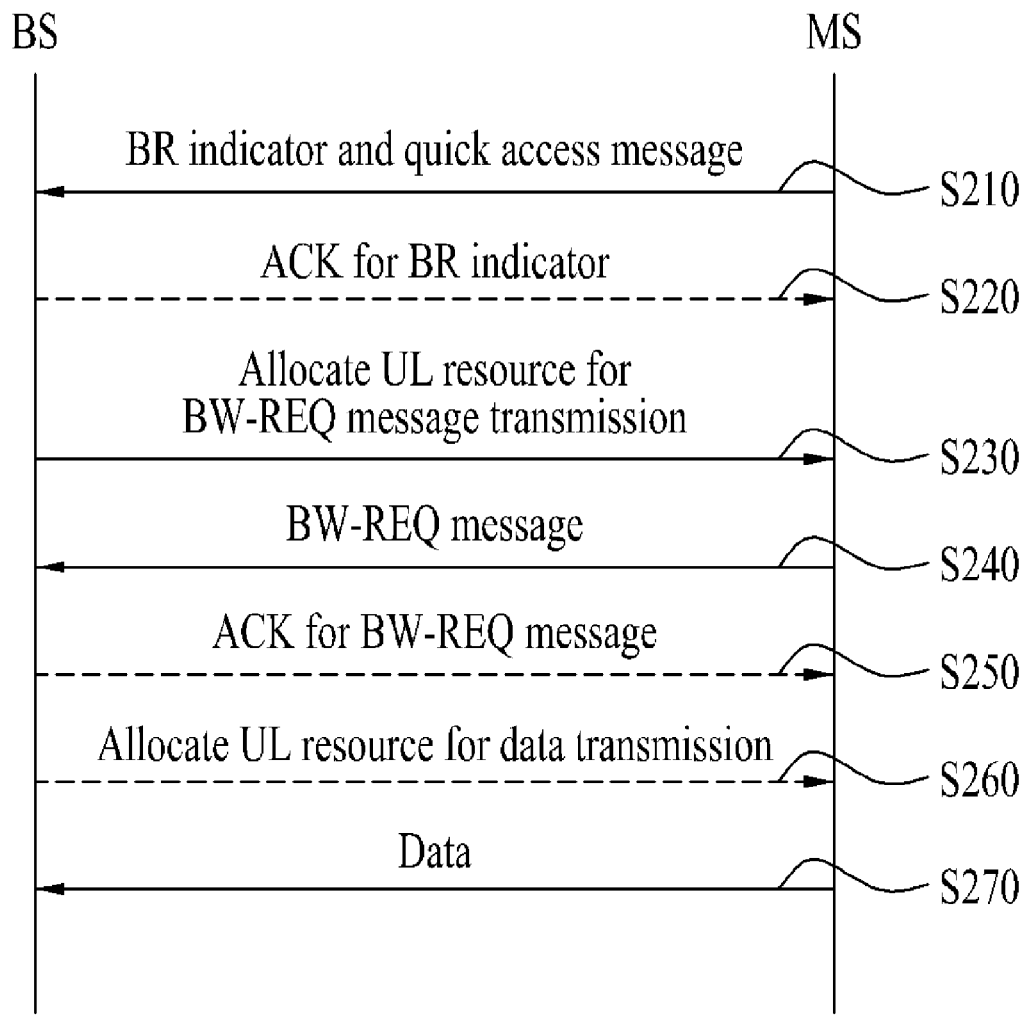
FIG. 2 is a diagram for a random access method in a future broadband wireless access system.
Figure 3:
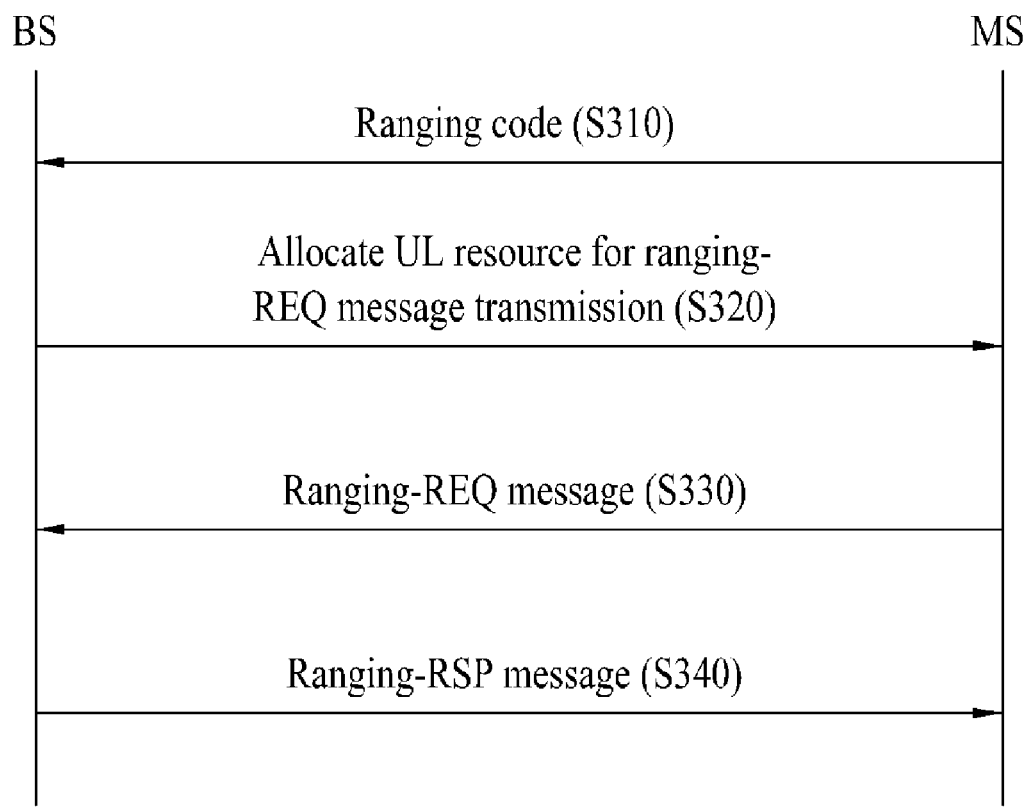
FIG. 3 is a diagram of a ranging process in a wireless communication system according to a related art.
Figure 4:
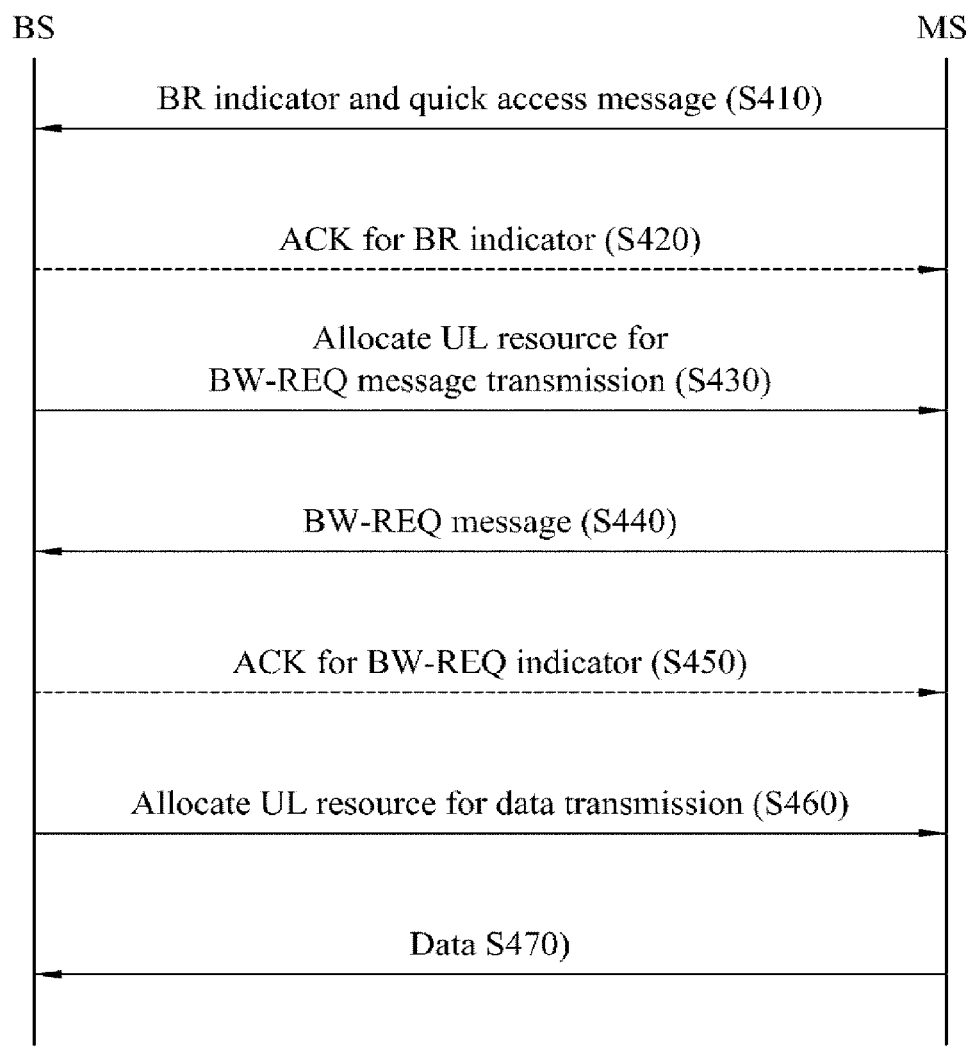
FIG. 4 is a diagram of a process for requesting an uplink bandwidth in a future broadband wireless access system.
Figure 5:
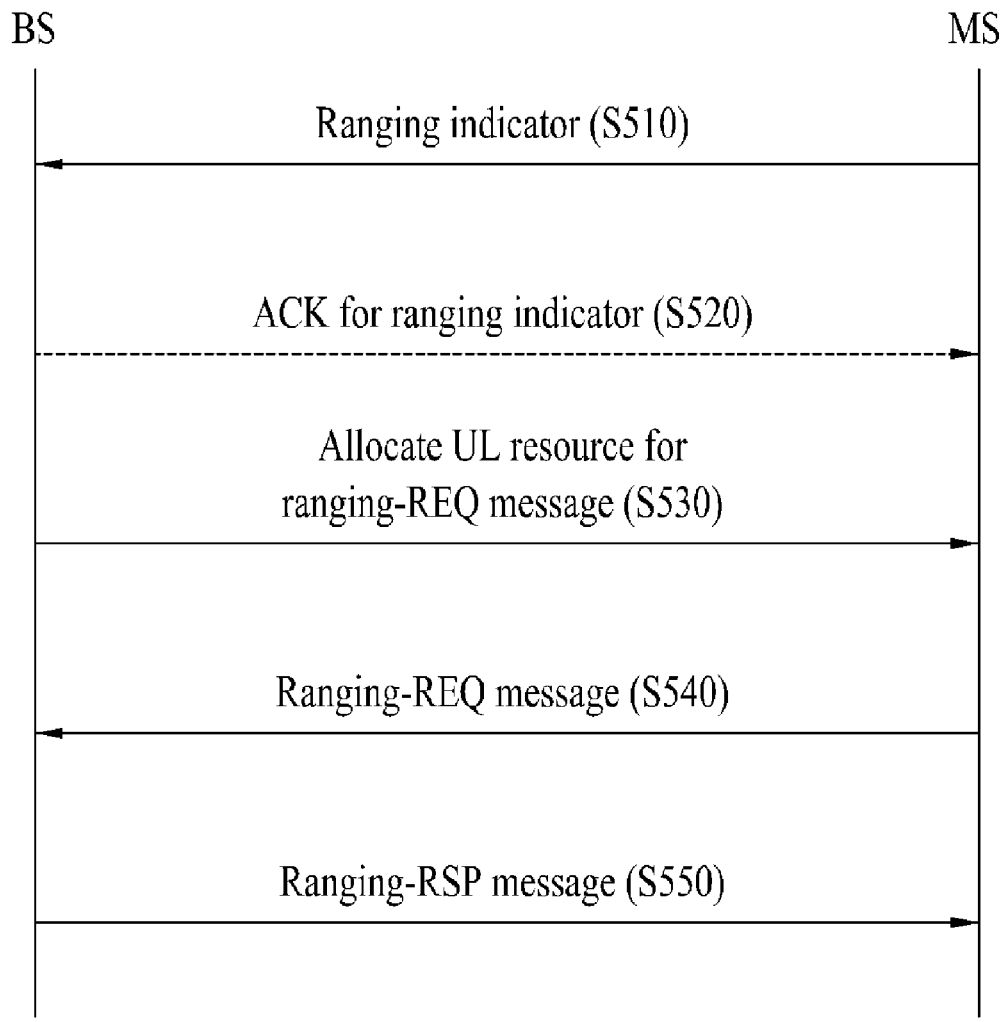
FIG. 5 is a diagram of a process for performing a ranging in a future broadband wireless access system.
Figure 6:
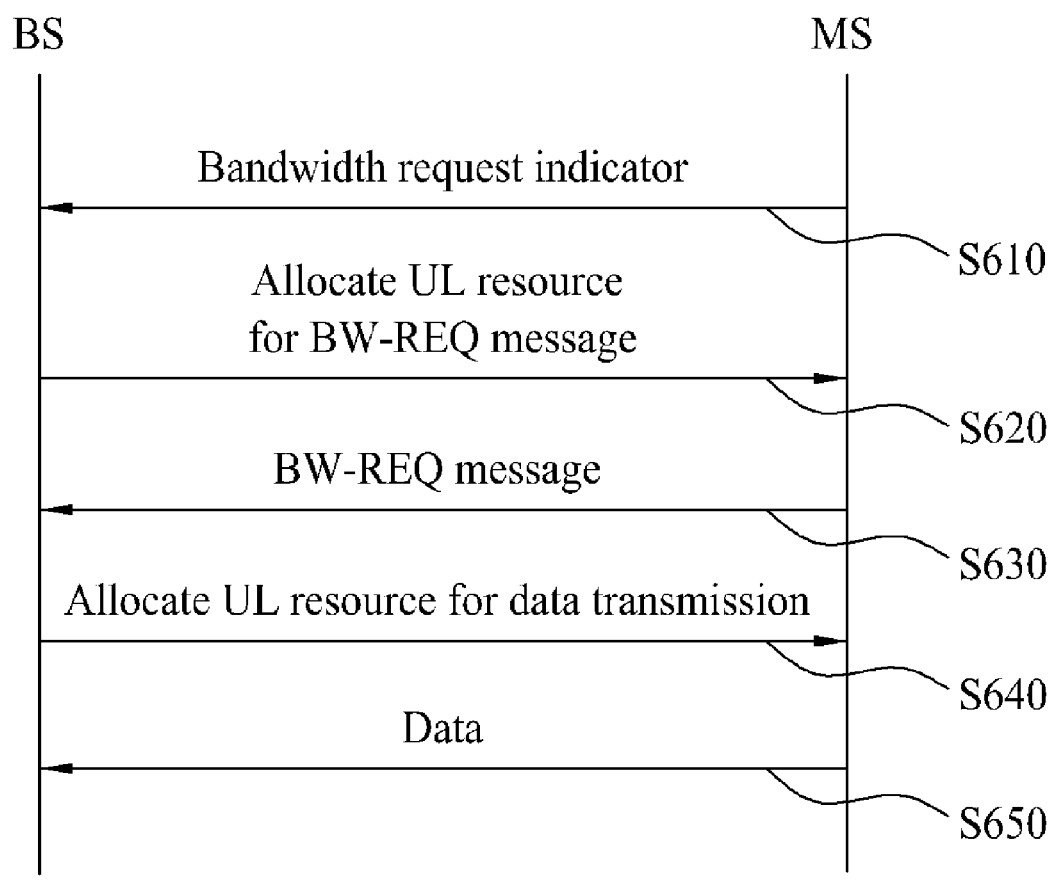
FIG. 6 is a diagram of a process for allocating a resource in a wireless communication system according to an embodiment of the present invention.

FIG. 6 is a diagram of a process for allocating a resource in a wireless communication system according to an embodiment of the present invention.

In a wireless communication according to the present invention, a base station supports a 5-step scheme and a 3-step scheme (quick access scheme) both. By the 3-step scheme, steps S610, S640 and S650 shown in FIG. 6 are performed. By the 5-step scheme, all steps S610 to S650 are performed.

The 5-step scheme is usable by being independent from the 3-step or can be used as a substitute for the 3-step scheme.

Referring to FIG. 6, in the 3-step scheme, a mobile station transmits a bandwidth request for requesting a resource allocation for a data transmission to a base station. In this case, the bandwidth request is the information first transmitted by the mobile station to make a request for the resource allocation to the base station. And, the bandwidth request can be carried on an indicator or both indicator and message (quick access message). The bandwidth request includes information on a necessary uplink resource and can include a mobile station ID (MS ID), a bandwidth request size and a QoS level.

The QoS level means a level of QoS requested by the mobile station and can be replaced by such a terminology as a QoS index, a QoS ID and the like. The QoS level can be determined according to various QoS parameters including a grant scheduling type, a latency and the like.

In this embodiment of the present invention, a bandwidth request is carried on a bandwidth request indicator for example, by which the present invention is non-limited. And, this embodiment includes a case of transmitting a code, a random access preamble, a message or the like to request a bandwidth from a base station.

Having received the bandwidth request indicator from the mobile station, the base station allocates an uplink resource to the mobile station [S640]. The mobile station then transmits data via the allocated resource [S650]. In doing so, the mobile station is able to transmit additional uplink bandwidth request information.

In the 5-step scheme, if the mobile station transmits the bandwidth request indicator to the base station [S610], the base station allocates an uplink resource for sending a bandwidth request message (BW-REQ message) to the mobile station [S620]. If the mobile station sends a bandwidth request message via the allocated resource [S630], the base station allocates an uplink resource to the mobile station [S640]. The mobile station then transmits data via the allocated resource [S650]. In doing so, the mobile station is able to transmit additional uplink bandwidth request information.

According to one embodiment of the present invention, in transmitting a bandwidth request indicator or a bandwidth request message, a mobile station is able to transmit a QoS level of data to transmit together with a mobile station ID and a bandwidth request size. A base station is able to grant a priority to a bandwidth request made by each mobile station and is able to recognize a resource allocation standby time which is to be used by the mobile station.

According to another embodiment of the present invention, in transmitting a bandwidth request indicator or a bandwidth request message, a mobile station is able to transmit an index of a resource allocation standby time to be used together with a mobile station ID and a bandwidth request size.

According to a further embodiment of the present invention, in transmitting a bandwidth request indicator or a bandwidth request message, a mobile station is able to transmit a flow identification (ID) together with a mobile station ID and a bandwidth request size. A base station is then able to estimate a QoS level of data, which is to be transmitted by the mobile station, or an index of a resource allocation standby time which is to be used by the mobile station.

The base station is able to estimate a timing point of transmitting a bandwidth request indicator or a bandwidth request message, a QoS level of data which is to be transmitted by the mobile station via a resource region for transmitting a bandwidth request indicator or a bandwidth request message or information of a bandwidth request code, or an index of a resource allocation standby time which is to be used by the mobile station.

If prescribed information delivered via a message (quick access message) transmitted together with a bandwidth request indicator or a bandwidth request message (BW-REQ message) includes QoS information, the base station is able to estimate a QoS level of data to be transmitted by the mobile station or an index of a resource allocation standby time to be used by the mobile station using the QoS information. For instance, if a bandwidth request size includes characteristics (e.g., a presence or non-presence of signaling data, a service type, urgency for a request) of the request as well as information on a size, it is able to estimate an index of a resource allocation standby time through this information.

In case that a mobile station makes a request for a plurality of connections via one bandwidth request indicator or one bandwidth request message to a base station, the mobile station transmits a QoS level o the connection having a highest QoS level of data to transmit among a plurality of the connections or an index of a resource allocation standby time of the connection having a smallest resource allocation standby time to use.

If a mobile station does not transmit a QoS level, an index of a resource allocation standby time, or a value for estimating the QoS level or the index of the resource allocation standby time, the mobile station and the base station is able to apply a predetermined timer value by a superframe header (hereinafter abbreviated SFH), a message based explicit scheme or a message based implicit scheme.

In the following description, a bandwidth request transmitting method in a wireless communication system according to an embodiment of the present invention is explained with reference to FIGS. 7 to 11.

According to an embodiment of the present invention, a mobile station transmits a bandwidth request to a base station to make a request for a resource allocation for a data transmission and then stands by for a resource allocation standby time determined according to a QoS level of data to transmit.

Figure 7:
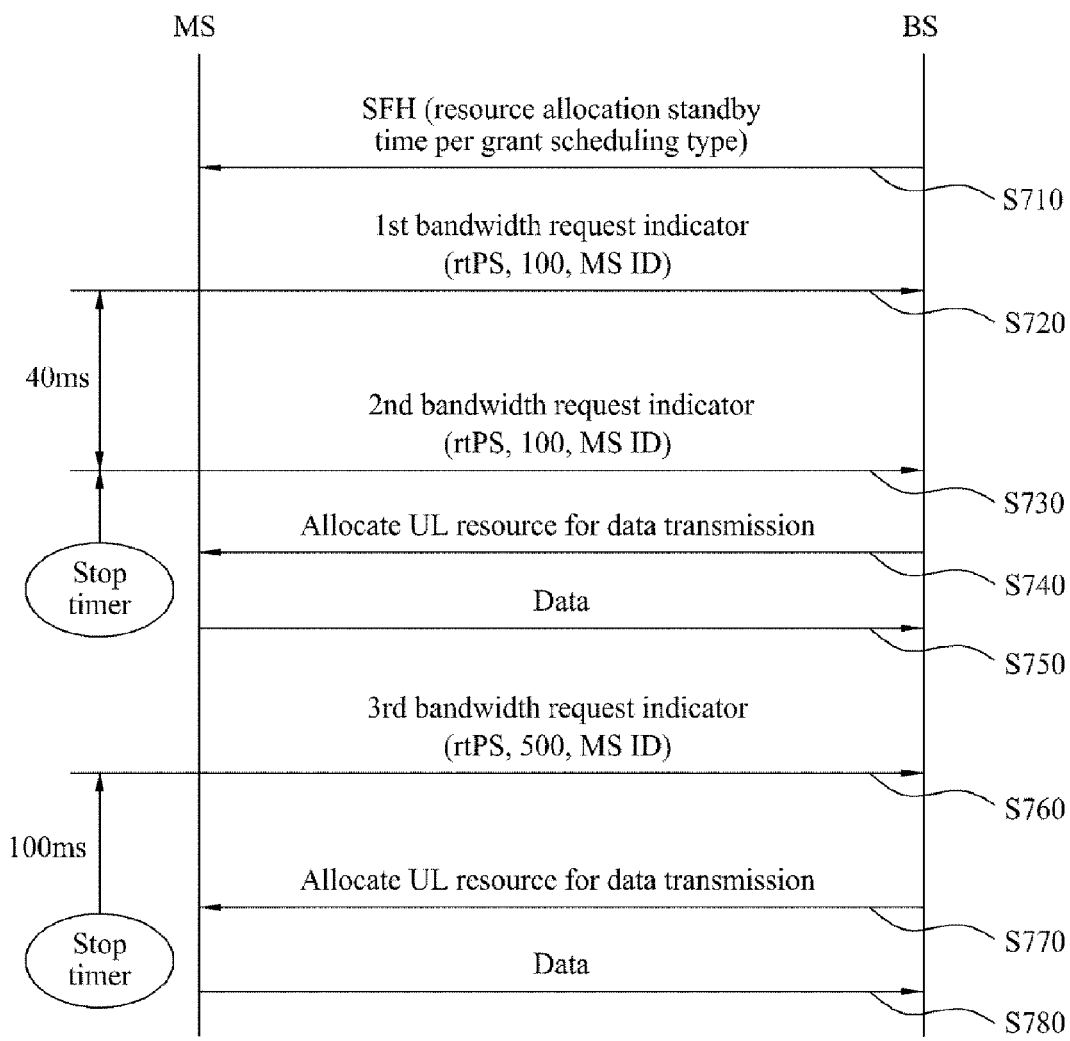
FIG. 7 is a diagram for a method of performing a bandwidth request process in a wireless communication system according to a first embodiment of the present invention in a 3-step scheme.

FIG. 7 is a diagram for a method of performing a bandwidth request process in a wireless communication system according to a first embodiment of the present invention in a 3-step scheme. According to a first embodiment of the present invention, a base station transmits a resource allocation standby time per QoS to a mobile station via a broadcast message. In the first embodiment of the present invention, a resource allocation standby time is set in consideration of a grant scheduling type among various factors that determine a QoS level for example. In particular, it is ale to set a resource allocation standby time in consideration of another factor e.g., latency, etc.) for determining a QoS level.

Referring to FIG. 7, a base station broadcasts a resource allocation standby time per grant scheduling type via SFH [S710].

Table 1 illustrates an example of a resource allocation standby time per grant scheduling type. In Table 1, a unit of a resource allocation standby time is set to ms. Alternatively, the unit of the resource allocation standby time can be set to a subframe, a frame or a superframe.

TABLE 1

| QoS level<br>Grant scheduling type | Resource allocation<br>standby time (ms) |
|---|---|
| Unsolicited Grant Service<br>(UGS) | 40 |

TABLE 1-continued

| QoS level Grant scheduling type | Resource allocation standby time (ms) |
|---|---|
| real-time Polling Service (rtPS) | 40 |
| extended-real-time Polling Service (ertPS) | 40 |
| nrtPS (non-real-time Polling Service) | 100 |
| BE (best effort) | 150 |

In order to transmit data having a characteristic of a real-time Polling Service (hereinafter abbreviated 'rtPS'), a mobile station transmits a first bandwidth request indicator to the base station [S720] and sets a time of a timer to 40 ms that is a resource allocation standby time corresponding to the rtPS. In this case, the bandwidth request indicator includes a grant scheduling type rtPS, a bandwidth request size and a mobile station ID.

If a response is not made by the base station within 40 ms, the mobile station transmits a second bandwidth request indicator [S730] and sets a time of the timer to 40 ms. If an uplink resource is allocated by the base station within 40 ms [S740], the mobile station stops the timer and then transmits data via the allocated resource [S750].

Subsequently, the mobile station transmits a third bandwidth request indicator for transmitting data having a characteristic of a non-real-time Polling Service (hereinafter abbreviated 'nrtPS') to the base station [S760] and sets a time of the timer to 100 ms that is a resource allocation standby time corresponding to the nrtPS. In this case, the bandwidth request indicator includes a grant scheduling type nrtPS, a bandwidth request size 500 and a mobile station ID. If the mobile station has an uplink resource allocated thereto from the base station within 100 ms [S770], the mobile station stops the time and then transmits the data via the allocated resource [S780].

Now, a method of transmitting a bandwidth request in a wireless communication system according to a first embodiment of the present invention in a 5-step scheme is explained with reference to FIG. 8 and FIG. 9 as follows.

Figure 8:
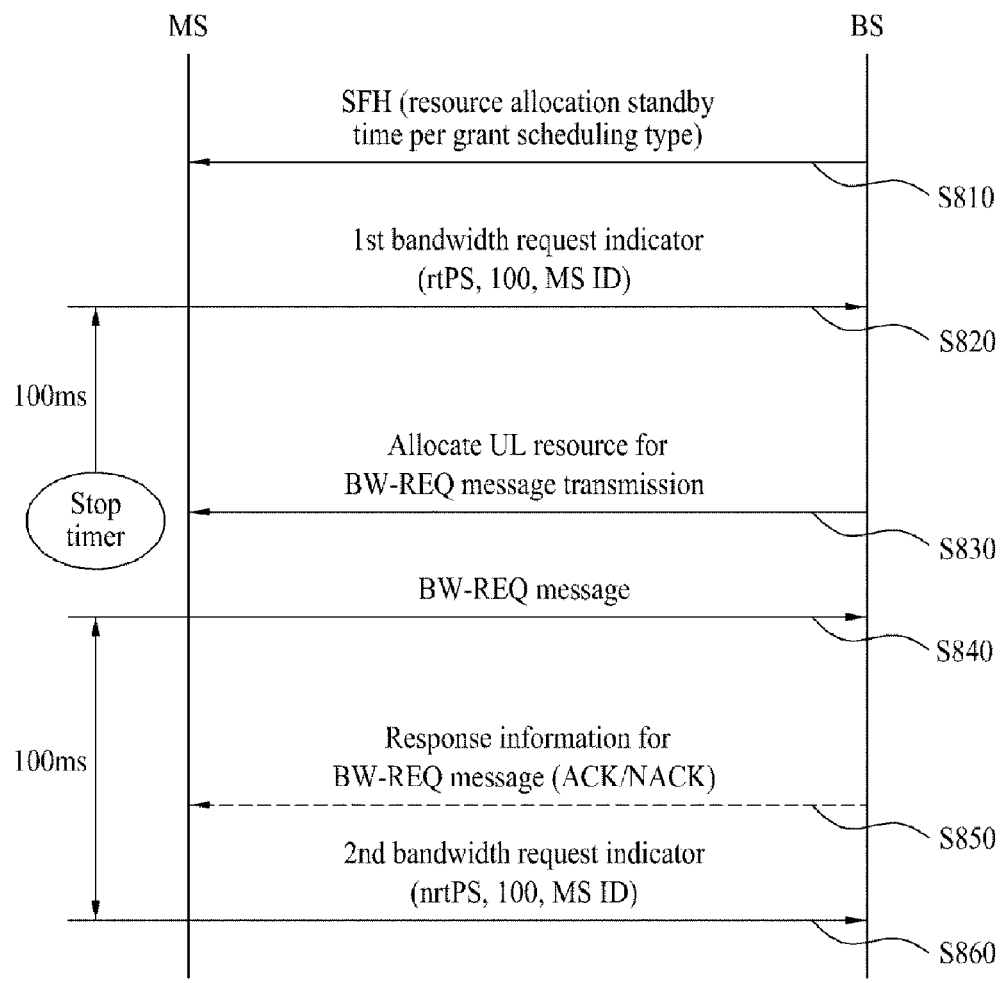
FIG. 8 is a diagram for a case of setting a response information standby time for a BW-REQ message to be equal to a resource allocation standby time in a 5-step scheme.
Figure 9:
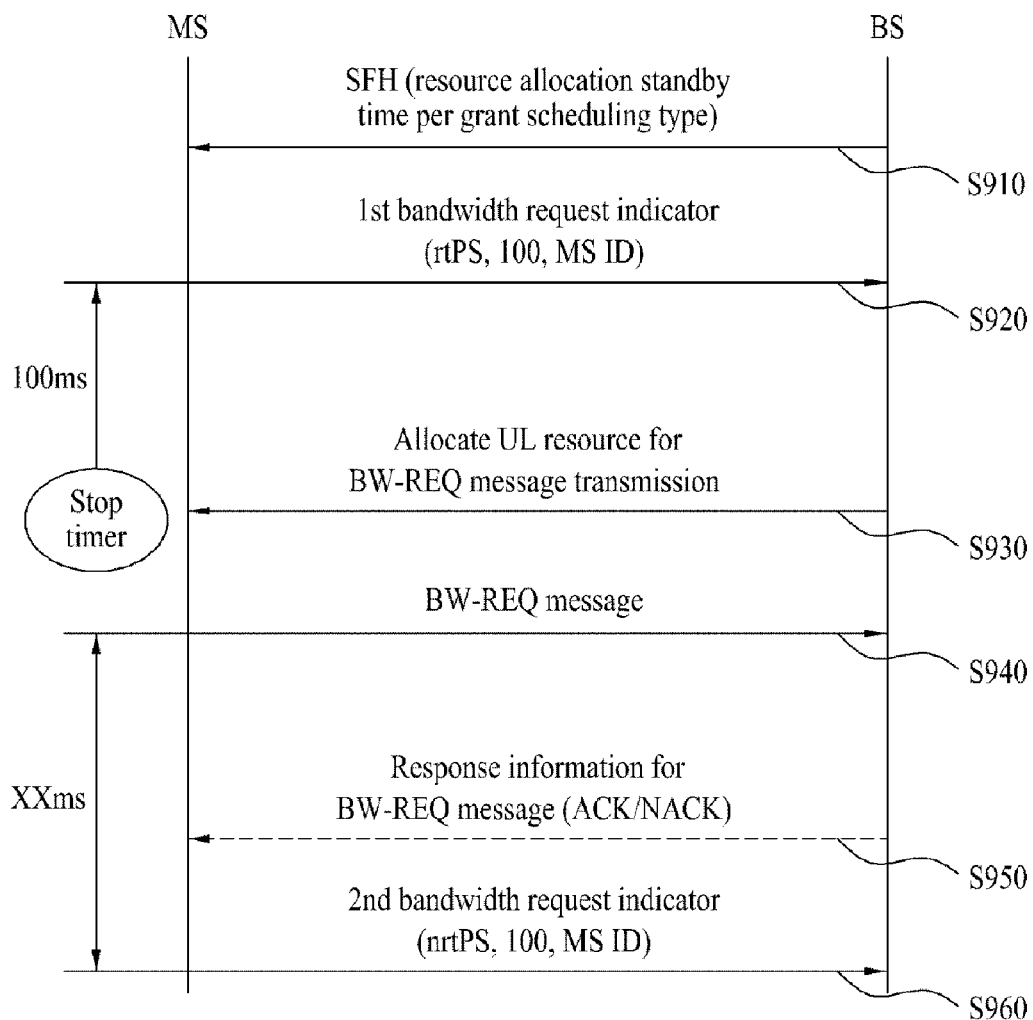
FIG. 9 is a diagram for a case of setting a response information standby time for a BW-REQ message to be different from a resource allocation standby time in a 5-step scheme.

FIG. 8 is a diagram for a case of setting a response information standby time for a BW-REQ message to be equal to a resource allocation standby time in a 5-step scheme, and FIG. 9 is a diagram for a case of setting a response information standby time for a BW-REQ message to be different from a resource allocation standby time in a 5-step scheme. A response information standby time for a BW-REQ message is a waiting time until a bandwidth request indicator is retransmitted due to failure in receiving ACK/NACK (acknowledgement/negative acknowledgement) for the BW-REQ message, after the mobile station has transmitted the BW-REQ message.

Referring to FIG. 8 and FIG. 9, a base station broadcasts a resource allocation standby time per grand scheduling type via SFH [S810, S910].

A mobile station transmits a first bandwidth request indicator to the base station to transmit data having an nrtPS characteristic [S820, S920] and sets a time of a timer to 100 ms that is a resource allocation standby time corresponding to nrtPS. In this case, a bandwidth request indicator includes a grand scheduling type nrtPS, a bandwidth request size 100 and a mobile station ID.

If an uplink resource is allocated to the mobile station by the base station within 100 ms [S830, S930], the mobile station stops the timer, transmits a BW-REQ message via the allocated resource [S840, S940], and sets a time of the timer to a response information standby time for the BW-REQ message. In doping so, the response information standby time for the BW-RREQ message can be set to 100 ms that is the resource allocation standby time, as shown in FIG. 8, or can be set to a value different from the resource allocation standby time 100 ms, as shown in FIG. 9.

If the mobile station fails to receive response information for the BW-REQ message within the response information standby time for the BW-REQ message, the mobile station retransmits a second bandwidth request indicator [S860, S960].

In the following description, a method of performing a bandwidth request process in a wireless communication system according to a second embodiment of the present invention is explained with reference to FIG. 10.

Figure 10:
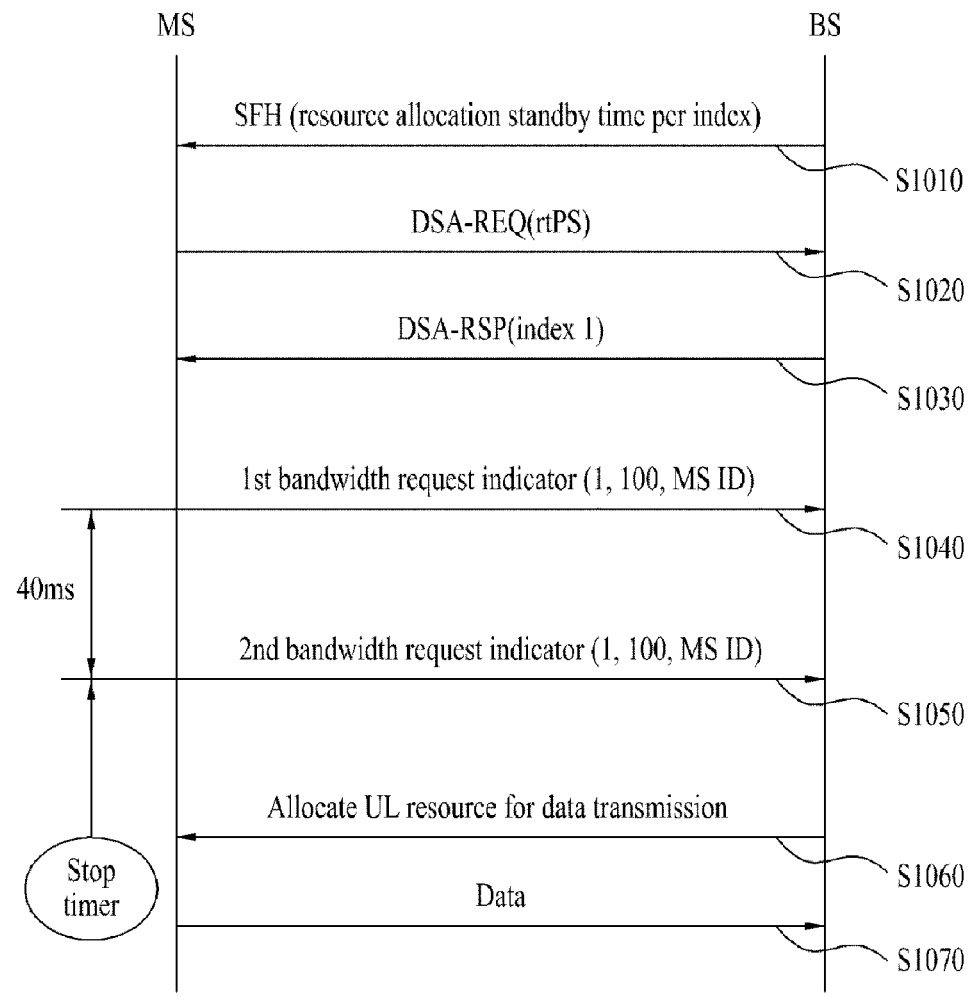
FIG. 10 is a diagram for a method of performing a bandwidth request process in a wireless communication system according to a second embodiment of the present invention in a 3-step scheme.

FIG. 10 is a diagram for a method of performing a bandwidth request process in a wireless communication system according to a second embodiment of the present invention in a 3-step scheme.

According to a second embodiment of the present invention, a base station transmits a per-index resource allocation standby time and an index of a resource allocation standby time corresponding to a corresponding connection via MAC message.

Referring to FIG. 10, a base station transmits a per-index resource allocation standby time via SFH [S1010].

Table 2 shows an example of a per-index resource allocation standby time. In Table 2, a unit of a resource allocation standby time is set to 'ms'. Yet, the unit of the resource allocation standby time can be set to a subframe, a frame or a superframe.

TABLE 2

| Index | Resource allocation standby time |
|---|---|
| 1 | 40 |
| 2 | 100 |
| 3 | 150 |
| 4 | 200 |

In order to generate a dynamic service connection, a mobile station sends a dynamic service addition request (hereinafter abbreviated DSA-REQ) message to the base station [S1020]. In this case, the DSA-REQ message can include QoS level information of data the mobile station attempts to transmit. In FIG. 10, the DSA-REQ message includes a grant scheduling type rtPS for example of the QoS level information.

The base station informs the mobile station of an index 1 of a stand by time for allocation of a resource, which is to be used by the mobile station, via a dynamic service addition response (hereinafter abbreviated DSA-RSP) message in response to the DSA-REQ message [S1030].

In order to transmit data having a real time polling service characteristic, the mobile station transmits a first bandwidth request indicator to the base station [S1040] and sets a time of a timer to 40 ms that is a resource allocation standby time corresponding to the index 1. In this case, the bandwidth request indicator includes an index 1, a bandwidth request size 100 and a mobile station ID.

If there is no response from the base station within 40 ms, the mobile station transmits a second bandwidth request indicator [S1050] and then sets a time of the timer to 40 ms. If an uplink resource is allocated to the mobile station by the base station within 40 ms [S1060], the mobile station stops the timer and then transmits the data via the allocated resource [S1070].

A bandwidth request transmitting method in a wireless communication system according to a second embodiment of the present invention provides the following advantage. Namely, a same resource allocation standby time is not applied to a mobile station having a same QoS level but a resource allocation standby time can be differently applied to a mobile station having a same QoS level according to a situation of a base station.

In a first or second embodiment of the present invention, when a base station transmits a resource allocation standby time per grant scheduling type or a resource allocation standby time per index to a mobile station, the base station is able to transmit a value of the resource allocation standby time itself or a difference value from a default value by predetermining the default value of the resource allocation standby time per QoS or index.

Figure 19:
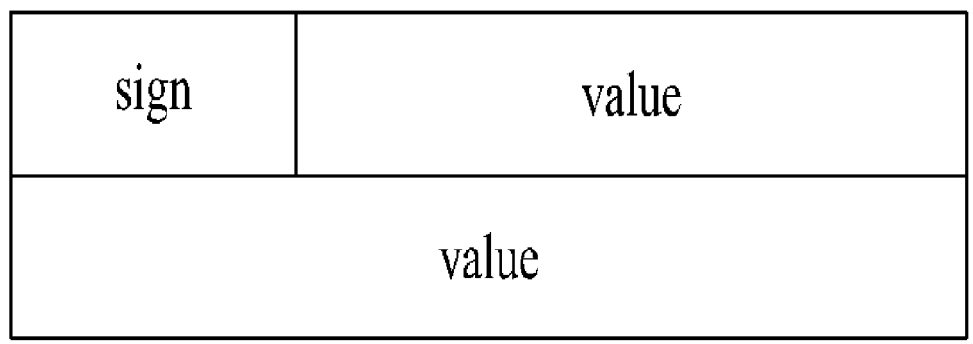
FIG. 19 is a diagram for a data format of a difference value if a resource allocation standby time is transmitted in form of the difference value from a default value.

FIG. 19 is a diagram for a data format of a difference value if a resource allocation standby time is transmitted in form of the difference value from a default value.

Referring to FIG. 19, a sign field is the field that indicates whether a resource allocation standby time is greater or smaller than a default value. If the sign field exists, a value field indicates a difference between a default value and a resource allocation standby time. If the sign field does not exist, a value field indicates a value resulting from subtracting a default value from a resource allocation standby time.

For instance, if a value of a resource allocation standby time is greater than a default value, assume that a sign field is set to 1. If a value of a resource allocation standby time is smaller than a default value, assume that a sign field is set to 0. When a default value is 40 ms, if a resource allocation standby time value a base station is going to transmit to a mobile station is 46 ms, a sign field is set to 1 and a value field is set to 6 ms.

In this case, the value field can be represented by a general expression, a power expression or a step expression.

In the general expression, a value to be transmitted is expressed as a binary number. For instance, a value to be transmitted is 6 ms, a value field is expressed as 110.

In the power expression, a value to be transmitted is converted to an exponent of a predetermined value to express the exponent as a binary number. For instance, if a pre-determined value is 2 and a value to be transmitted is 64 ms, as 64 is equal to 26, a value field is expressed as 110 that is a binary number of 6.

In the step expression, a value is converted to a multiple of a predetermined value to express the multiple as a binary number. For instance, if a predetermined value is 5 and a value to be transmitted is 30 ms, as 30 is equal to 5*6, a value field is expressed as 110 that is a binary number of 6.

A default value of a resource allocation standby time per QoS or index can be known to a mobile station and a base station in advance or can be notified via SFH to a mobile station by a base station. And, a difference between a resource allocation standby time and a default value can be notified to a mobile station by a base station via SFH or MAC message.

For instance, assume that a default value of a per-index resource allocation standby time has the value shown in Table 2. Assume that a per-index resource allocation standby time a base station is gong to transmit to a mobile station has the value shown in Table 3. Assume that a data format of a difference value between a default value and a resource allocation standby time used a format including a value field only by expressing the difference value as 3 bits. And, assume that 10 ms-step expression is used.

On the above assumptions, a resource allocation standby time corresponding to an index 1 is 40 and has a difference from a default value set to 0. '0' is equal to a zero time of 10. And, 'zero' can be expressed as a binary number of '000'.

A resource allocation standby time corresponding to an index 2 is 110 and has a difference from a default value set to 10. '10' is equal to one time of 10. And, 'one' can be expressed as a binary number of '001'.

A resource allocation standby time corresponding to an index 3 is 170 and has a difference from a default value set to 20. '20' is equal to two times of 10. And, 'two' can be expressed as a binary number of '010'.

A resource allocation standby time corresponding to an index 4 is 230 and has a difference from a default value set to 30. '30' is equal to three times of 10. And, 'three' can be expressed as a binary number of '011'.

Therefore, the base station transmits 000001010011 to the mobile station.

TABLE 3

| Index | Resource allocation standby time |
|---|---|
| 1 | 40 |
| 2 | 110 |
| 3 | 170 |
| 4 | 230 |

A method of transmitting a bandwidth request in a wireless communication system is explained with reference to FIGS. 11 to 14 as follows. According to a third embodiment of the present invention, a base station transmits a resource allocation standby time, which is to be used by a mobile station, to the mobile station via a MAC message.

In this case, the base station able to transmit a resource allocation standby time to be used by the mobile station in consideration of data the mobile station is going to transmit or is able to transmit a resource allocation standby time set. The resource allocation standby time set can include a resource allocation standby time per grant scheduling type shown in Table 1 or a resource allocation standby time per service type. Table 4 shows an example of a resource allocation standby time per service type.

TABLE 4

| QoS level Service type | Resource allocation standby time |
|---|---|
| Real time service | 40 |
| Non-real time service | 100 |

In the following description, explained is a case that a base station transmits a resource allocation standby time, which is to be used by a mobile station, in consideration of data the mobile station is going to transmit.

Figure 11:
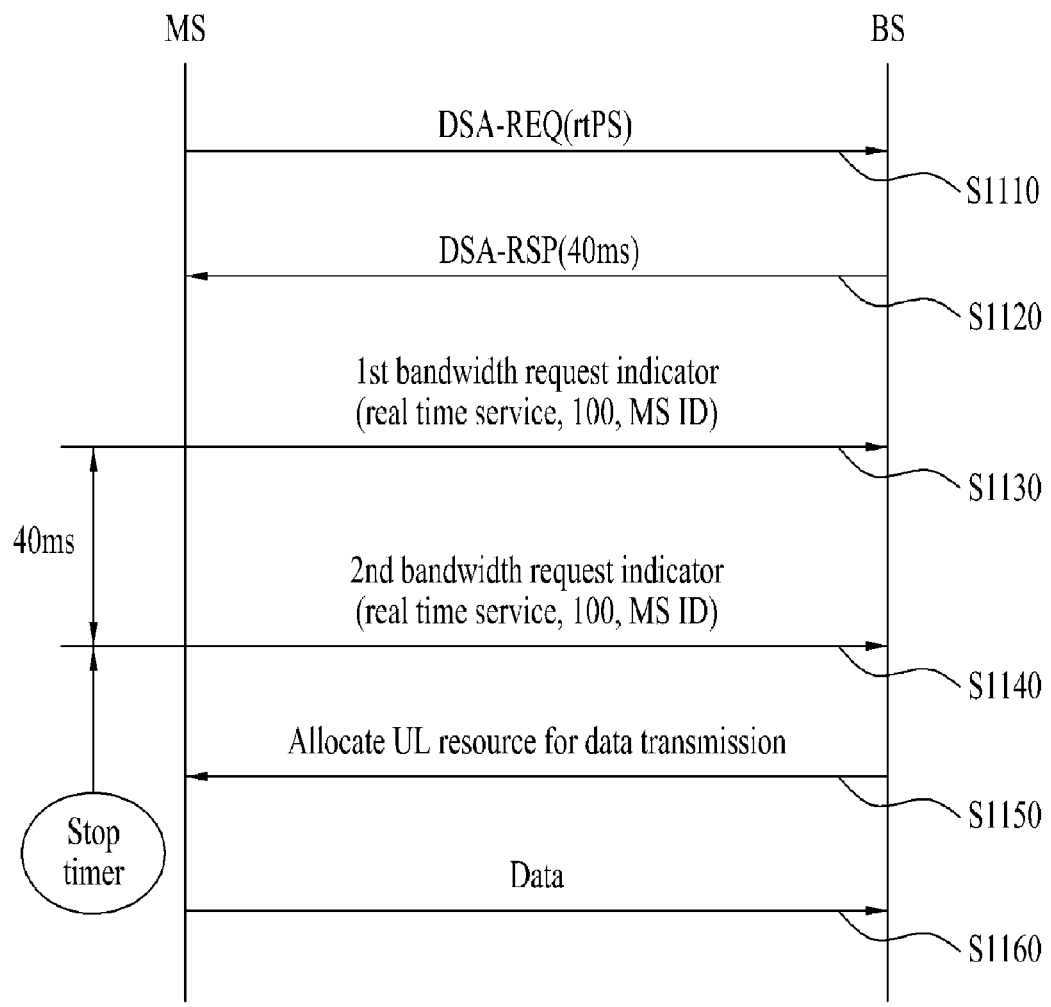
FIG. 11 is a diagram for a case of using a DSA-RSP message in a method of performing a bandwidth request process in a wireless communication system according to a third embodiment of the present invention.

FIG. 11 is a diagram for a case of using a DSA-RSP message in a method of performing a bandwidth request process in a wireless communication system according to a third embodiment of the present invention.

Referring to FIG. 11, in order to generate a dynamic service connection, a mobile station sends a DSA-REQ message to a base station [S1110]. In this case, the DSA-REQ message includes a grant scheduling type 'rtPS' of data the mobile station is going to transmit.

Since the rtPS is a real-time service, the base station informs the mobile station of 40 ms, which is a resource allocation standby time to be used by the mobile station, via a DSA-RSP message [S1120].

The mobile station transmits a first bandwidth request indicator to the base station to transmit data having a real time polling service characteristic [S11301] and sets a time of a timer to 40 ms that is a resource allocation standby time received from the base station. In this case, the bandwidth request indicator includes a service type real time service, a bandwidth request size 100 and a mobile station ID.

If there is no response from the base station within 40 ms, the mobile station transmits a second bandwidth request indicator [S1140] and sets a time of the timer to 40 ms. If an uplink resource is allocated to the mobile station within 40 ms [S1150], the mobile station stops the timer and then transmits the data via the allocated resource [S1160].

Figure 12:
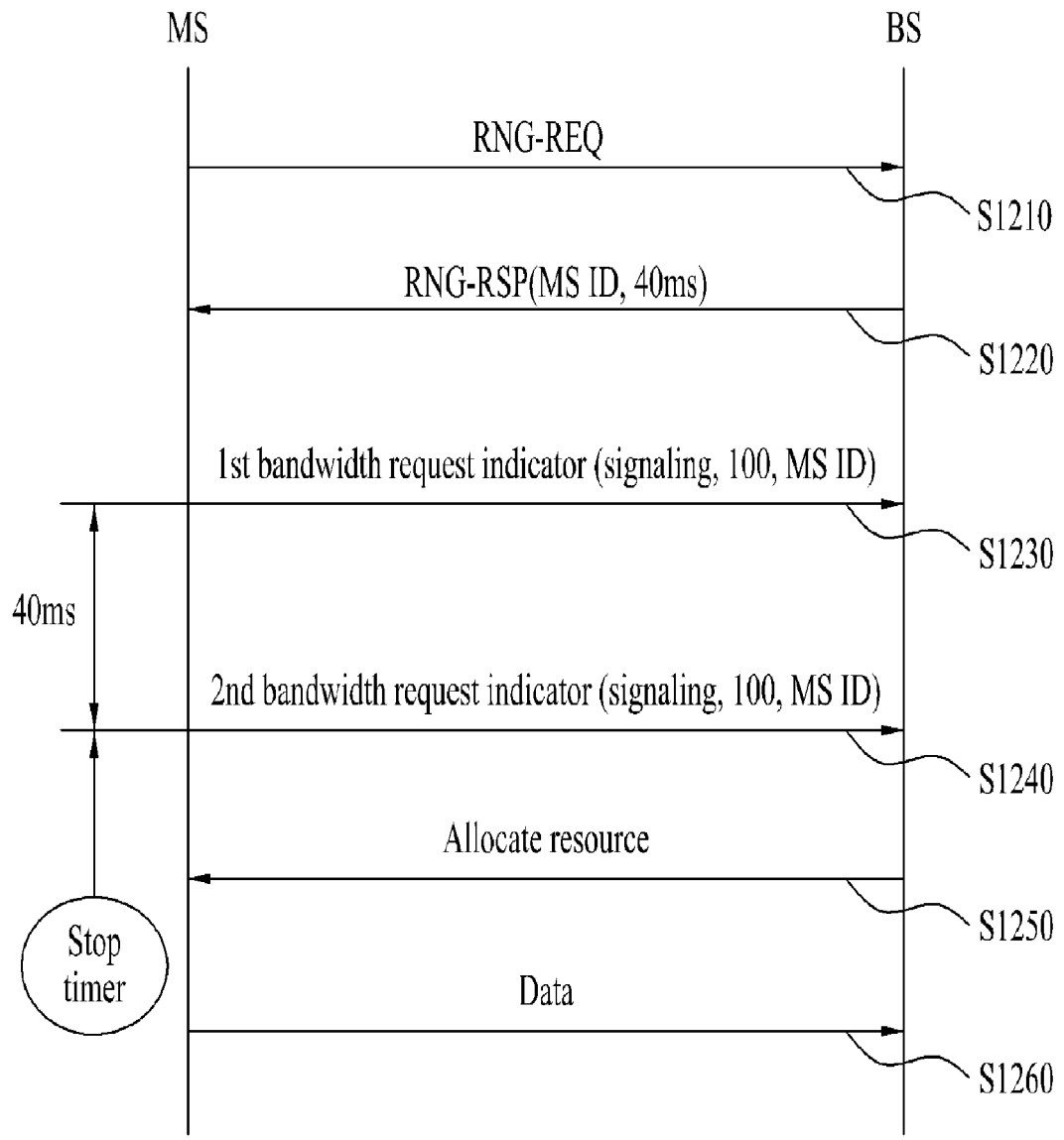
FIG. 12 is a diagram for a case of using a DNG-RSP message in a method of performing a bandwidth request process in a wireless communication system according to a third embodiment of the present invention.

FIG. 12 is a diagram for a case of using a DNG-RSP message in a method of performing a bandwidth request process in a wireless communication system according to a third embodiment of the present invention.

Referring to FIG. 12, a mobile station sends an RNG-REQ message to a base station to perform an initial network entry [S1210]. The base station informs the mobile station of 40 ms, which is a resource allocation standby time to be used for signaling data transmission by the mobile station, via an RNG-RSP message in response to the RNG-REQ message [S1220].

The mobile station transmits a first bandwidth request indicator to the base station to transmit signaling data having a real time polling service characteristic [S1230] and sets a time of a timer to 40 ms that is a resource allocation standby time received from the base station. In this case, the bandwidth request indicator includes a bandwidth request size 100 and a mobile station ID.

If there is no response from the base station within 40 ms, the mobile station transmits a second bandwidth request indicator [S1240] and sets a time of the timer to 40 ms. If an uplink resource is allocated to the mobile station within 40 ms [S1250], the mobile station stops the timer and then transmits the data via the allocated resource [S1260].

In the following description, a method of transmitting a bandwidth request for setting a resource allocation standby time in accordance with a priority of a mobile station to provide a differentiated service corresponding to the priority of the mobile station is explained with reference to FIGS. 13 to 15.

First of all, a base station can be aware of a priority of a mobile station via a MAC message or an uplink allocation request message.

The base station is able to determine the priority of the mobile station using a MAC address or a mobile station ID carried on such a MAC message as an RNG-REQ message and a DSA-REQ message. Since the MAC message is delivered via an uplink resource allocated to the mobile station by the base station, the base station is able to know which mobile station has sent the MAC message through the resource carrying the MAC message. Therefore, the base station is able to determine the priority of the mobile station.

In a contention based 3-step scheme, it is able to know a priority of a mobile station via a mobile station ID carried on a bandwidth request indicator. In a contention based 5-step scheme, it is able to know a priority of a mobile station via a mobile station ID carried on a BW-REQ message. In a non-contention based scheme, it is able to know a priority of a mobile station via such a dedicated resource of a mobile station as a code, a resource region and the like.

First of all, a method of transmitting bandwidth request information using a resource allocation standby time determined according to a priority of a mobile station without considering a QoS level of data is explained with reference to FIG. 13 as follows. FIG. 13 is a diagram for a method of transmitting a bandwidth request using one resource allocation standby time applicable to all connections of one mobile station.

Figure 13:
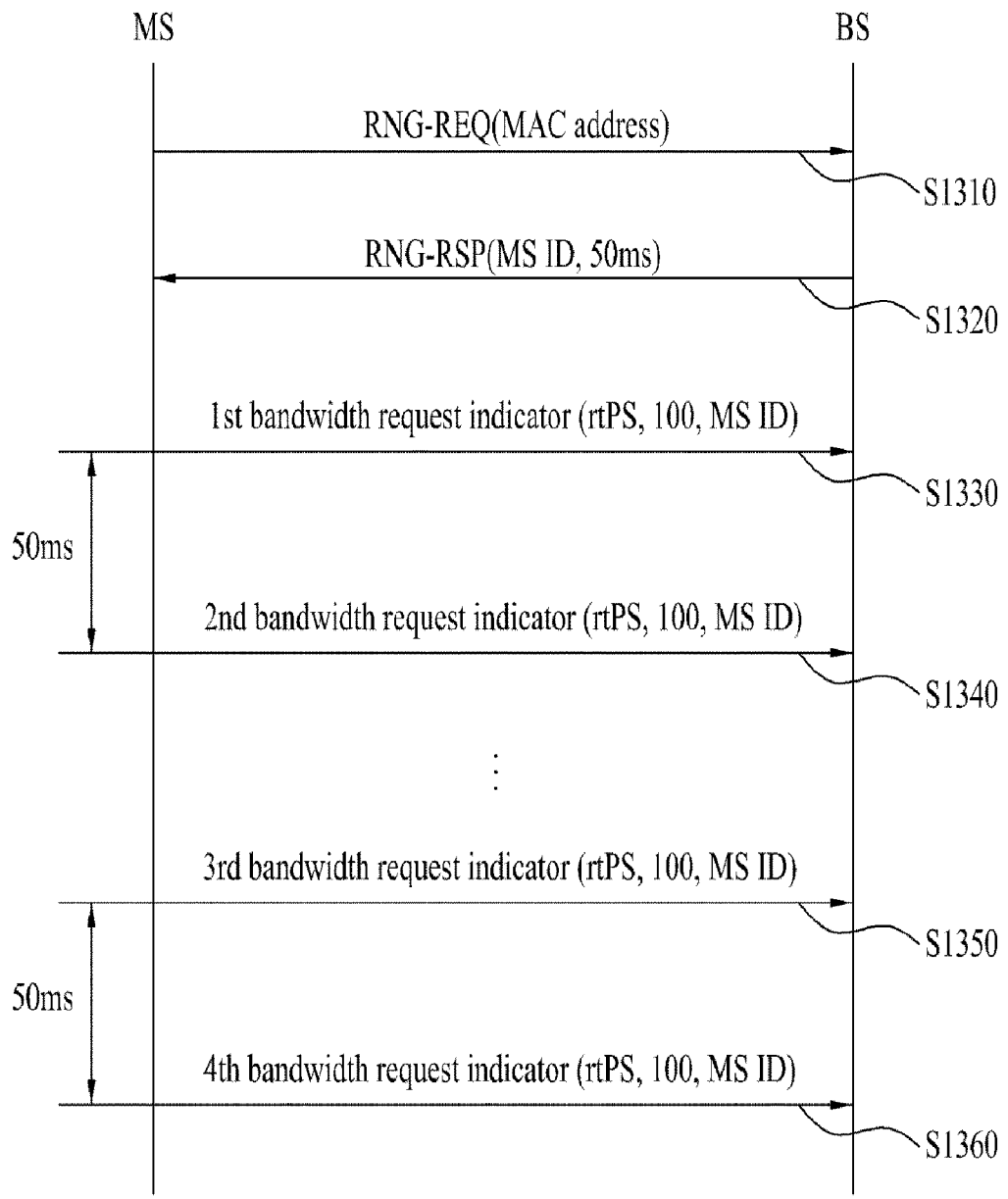
FIG. 13 is a diagram for a method of performing a bandwidth request process using one resource allocation standby time applicable to all connections of one mobile station.

Referring to FIG. 13, a mobile station sends an RNG-REQ message to a base station [S1310]. The base station determines a priority of the mobile station using a MAC address included in the RNG-REQ message and then informs the mobile station of a resource allocation standby time of the mobile station according to the priority via an RNG-RSP message [S1320]. For instance, if a resource allocation standby time of a mobile station having a priority 1 is 50 ms, a resource allocation standby time of a mobile station having a priority 2 is 150 ms, and a priority of a mobile station having sent an RNG-REQ message is 1, the base station informs the mobile station of 50 ms via an RNG-RSP message.

The mobile station transmits a first bandwidth request indicator to the base station to transmit data having a real time polling service characteristic [S1330] and then sets a time of a timer to 50 ms that is the resource allocation standby time received from the base station. In this case, the bandwidth request indicator includes a grant scheduling type rtPS, a bandwidth request size 100 and a mobile station ID. If there is no response within 50 ms from the base station, the mobile station transmits a fourth bandwidth request indicator [S1360].

Table 5 shows an example of a resource allocation standby time according to a grant scheduling type and priority as factors for determining a QoS level. In Table 5, a unit of a resource allocation standby time is represented as 'ms'. Yet, the unit of the resource allocation standby time can be set to a subframe, a frame or a superframe.

Referring to Table 5, it is able to set a resource allocation standby time for an emergency service or control signaling message to a fixed value.

TABLE 5

| | QoS level | | |
|---|---|---|---|
| Value | Grant scheduling type | Priority | Resource allocation standby time (ms) |
| 0000 | Emergency | — | 50 |
| 0001 | Control signaling | — | 50 |
| 0010 | UGS | — | 50 |
| 0011 | rtPS | High | 50 |
| 0100 | rtPS | Low | 100 |
| 0101 | ertPS | — | 50 |
| 0110 | nrtPS | High | 150 |
| 0111 | nrtPS | Low | 250 |
| 1000 | BE | — | 300 |

Table 6 or Table 7 shows an example of a resource allocation standby time according to a service type and priority as factors for determining a QoS level. In Table 6 or Table 7, a unit of a resource allocation standby time is represented as 'ms'. Yet, the unit of the resource allocation standby time can be set to a subframe, a frame or a superframe. Service types can be classified into a real time service and a non-real time service. Alternatively, service types can be classified into a delay sensitive service and a delay tolerant service.

In case of requesting an uplink resource for an emergency service or a control signaling message, a mobile station uses a resource allocation standby time corresponding to 'real-time service' and 'High' shown in Table 6 or 'delay sensitive service' and 'High' priority shown in Table 7.

TABLE 6

| Value | QoS level | | Resource allocation standby time (ms) |
|---|---|---|---|
| | Service type | Priority | |
| 00 | real-time service | High | 50 |
| 01 | real-time service | Low | 100 |
| 10 | non real-time service | High | 200 |
| 11 | non real-time service | Low | 250 |

TABLE 7

| Value | QoS level | | Resource allocation standby time (ms) |
|---|---|---|---|
| | Service type | Priority | |
| 00 | delay sensitive service | High | 50 |
| 01 | delay sensitive service | Low | 100 |
| 10 | delay tolerant service | High | 200 |
| 11 | delay tolerant service | Low | 250 |

Figure 14:
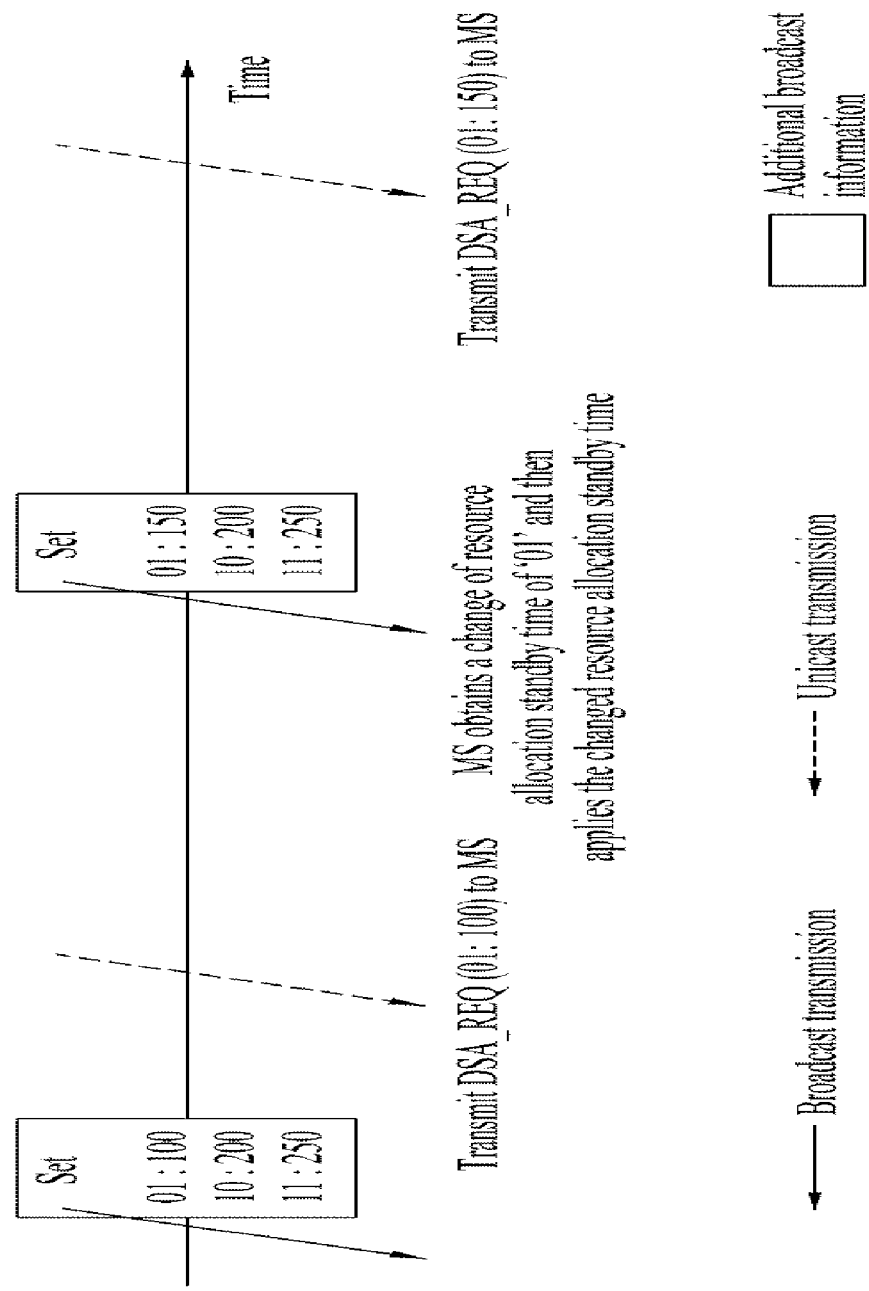
FIG. 14 is a diagram for a method of performing a bandwidth request process using a resource allocation standby time differing according to a QoS level for a plurality of connections of one mobile station.

FIG. 14 is a diagram for transmitting a resource allocation standby time determined according to a QoS level via additional broadcast information and a MAC message.

Referring to FIG. 14, a base station transmits a resource allocation standby time corresponding to a QoS level of data to transmit via MAC messages (RNG-REQ, RNG-RSP) exchanged in the course of performing ranging or MAC messages (DSA-REQ, DSA-RSP) exchanged in the course of generating a dynamic service.

And, the base station transmits a resource allocation standby time determined according to a QoS level in a manner that the resource allocation standby time is included in the additional broadcast information. In this case, an unchangeable resource allocation standby time value may not be included in the additional broadcast information. Resource allocation standby times are not changed within a transmission interval of the additional broadcast information.

In the following description, a method of transmitting bandwidth request information using a resource allocation standby time determined according to a QoS level of data and a priority of a mobile station is explained with reference to FIG. 15.

Figure 15:
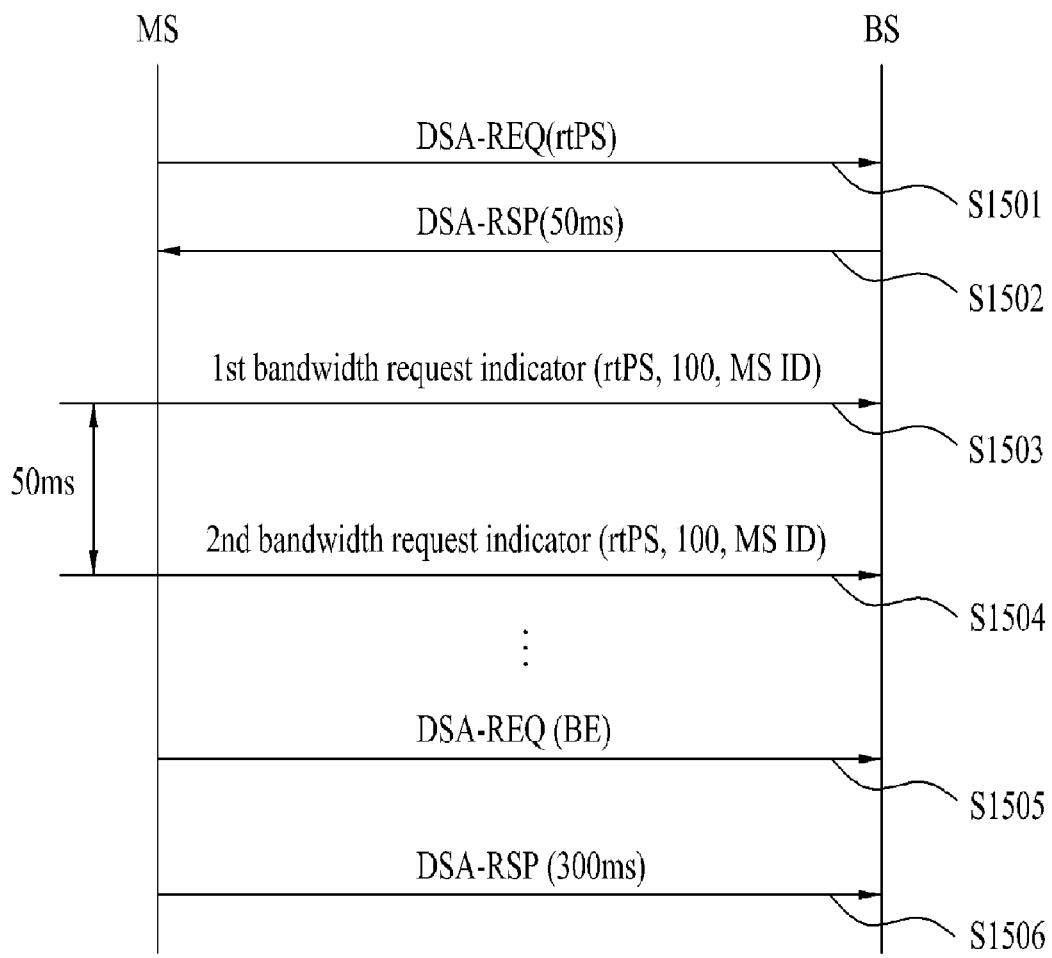
FIG. 15 is a diagram for a method of performing a bandwidth request process in a wireless communication system according to a fourth embodiment of the present invention.

FIG. 15 is a diagram for a method of transmitting a bandwidth request using a resource allocation standby time according to a QoS level for a plurality of connections of one mobile station having a high priority.

Referring to FIG. 15, a mobile station sends a DSA-REQ message to a base station [S1501]. The base station informs the mobile station of a resource allocation standby time according to a priority of the mobile station and a grant scheduling type of data, which is to be transmitted by the mobile station, via a DSA-RSP message [S1502]. Assuming that the resource allocation standby time shown in Table 5 is used, if a grant scheduling type of data to be transmitted is rtPS and a priority of the scheduling type is 'High', a mobile station is informed of 50 ms via a DSA-RSP message.

The mobile station transmits a first bandwidth request indicator to the base station to transmit data having a real time polling service characteristic [S1503] and sets a time of a timer to 50 ms, which is the resource allocation standby time received from the base station. In this case, the bandwidth request indicator includes a grant scheduling type rtPS, a bandwidth request size 100 and a mobile station ID. If there is no response from the base station within 50 ms, the mobile station transmits a second bandwidth request indicator [S1504].

Subsequently, the mobile station sends a DSA-REQ message to the base station [S1505]. The base station then informs the mobile station of '300 ms', which is a resource allocation standby time corresponding to a BE of the mobile station having a priority, via a DSA-RSP message.

In the following description, a method of transmitting a bandwidth request in a wireless communication system according to a fourth embodiment of the present invention is explained with reference to FIG. 16. According to a fourth embodiment of the present invention, a base station does not inform a mobile station of a resource allocation standby time but the mobile station uses a per-QoS resource allocation standby time previously determined in a wireless communication system. For instance, a resource allocation standby time corresponding to rtPS is 50 ms and a resource allocation standby time corresponding to nrtPS is 100 ms.

The per-QoS resource allocation standby time is determined by QoS level which is transmitted through a DSA-REQ message or a DSC-REQ message. QoS level is determined by Qos parameters and mobile station's priority and referred to as service class or access class. QoS level can be mapped to QoS information which is included in a quick access message with STID in 3-step BR procedure.

Figure 16:
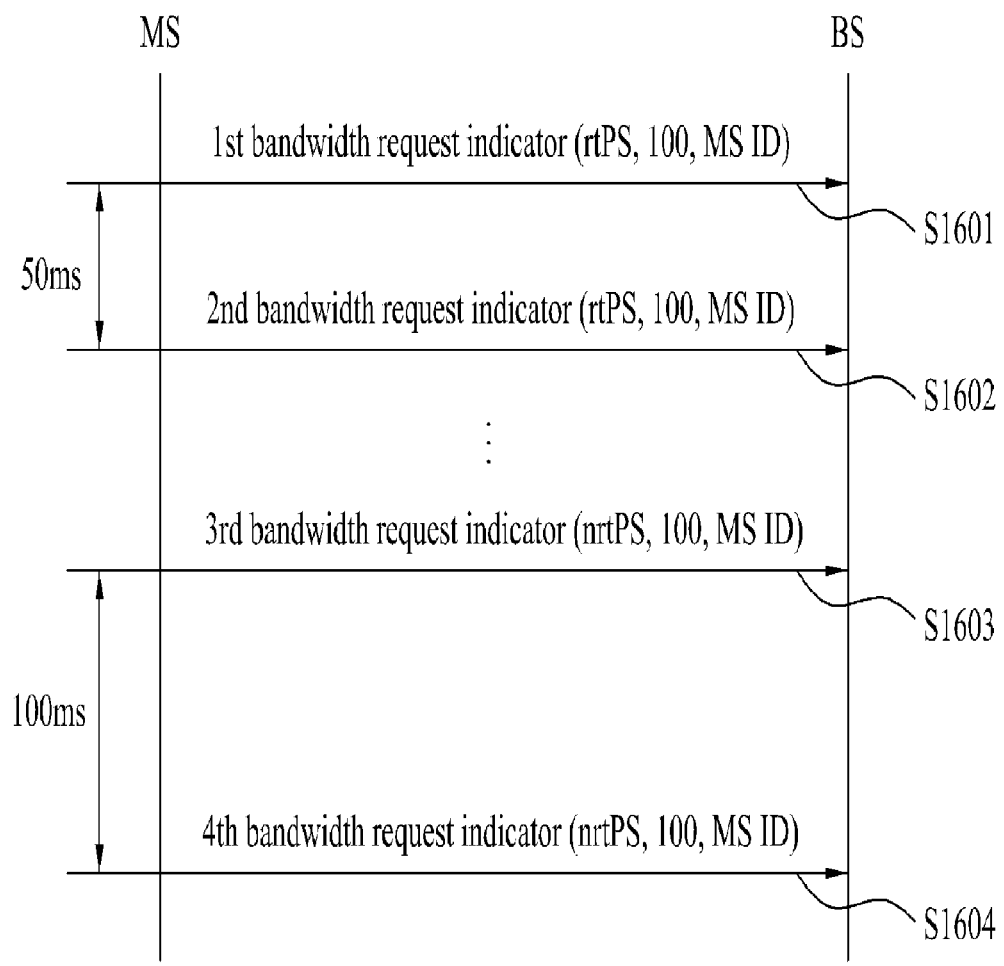
FIG. 16 is a flowchart of a process for resource allocation in a base station.

FIG. 16 is a diagram of a method of transmitting a bandwidth request in a wireless communication system according to a fourth embodiment of the present invention.

Referring to FIG. 16, a mobile station transmits a first bandwidth request indicator to a base station to transmit data having a real time polling service characteristic [S1601] and sets a time of a timer to '50 ms', which is a previously determined resource allocation standby time corresponding to rtPS. In this case, the bandwidth request indicator includes a grant scheduling type rtPS, a bandwidth request size 100 and a mobile station ID. If there is no response from the base station within 50 ms, the mobile station transmits a second bandwidth request indicator [S1602].

The mobile station transmits a third bandwidth request indicator to the base station to transmit data having a non-real time polling service characteristic [S1603] and sets a time of a timer to '100 ms', which is a previously determined resource allocation standby time corresponding to nrtPS. In this case, the bandwidth request indicator includes a grant scheduling type rtPS, a bandwidth request size 100 and a mobile station ID. If there is no response from the base station within 100 ms, the mobile station transmits a fourth bandwidth request indicator [S1604].

In the following description, after a base station has received a bandwidth request indicator or a BW-REQ message, a process for allocating a resource to a mobile station for a resource allocation standby time determined in consideration of a resource allocation standby time of the mobile station.

Figure 17:
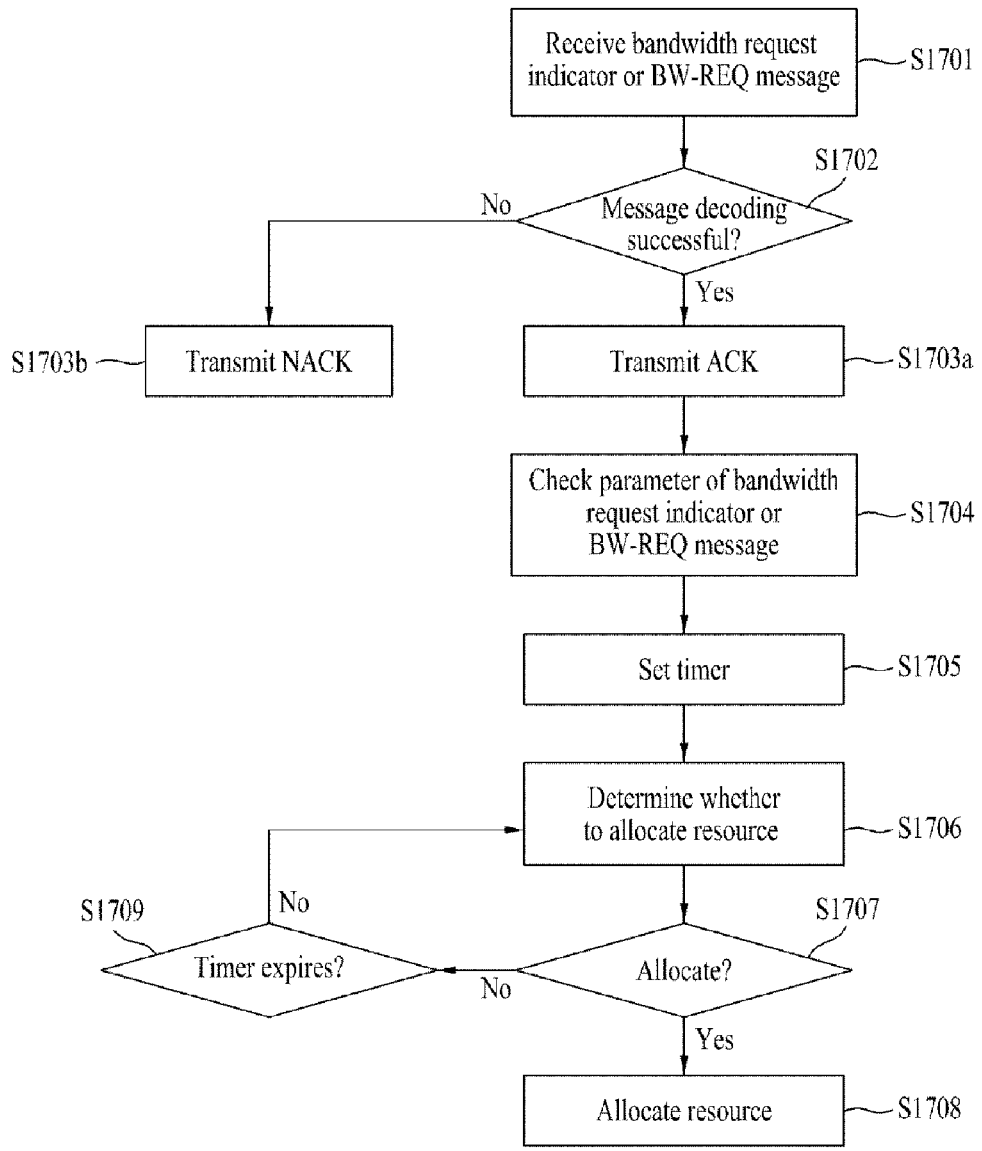
FIG. 17 is a diagram for a case of setting a timer after a mobile station has received response information in response to a bandwidth request indicator.

FIG. 17 is a flowchart of a process for resource allocation in a base station.

Referring to FIG. 17, a base station receives a bandwidth request indicator or a BW-REQ message from a mobile station [S1701] and then decodes the received indicator or message.

Once the bandwidth request indictor or the BW-REQ message is normally decoded, the base station sends an ACK message to the mobile station [S1703a]. If the bandwidth request indictor or the BW-REQ message is not normally decoded, the base station sends a NACK message to the mobile station [S1703b]. Optionally, the steps S1703a and S1703b of transmitting response information can be skipped.

The base station discovers a resource allocation standby time used by the mobile terminal by checking such a parameter as a QoS level and a timer index contained in the bandwidth request indicator or BW-REQ message [S1704] and then sets a time of a timer by calculating a resource allocation time from the resource allocation standby time used by the mobile station [S1705]. For instance, if the resource allocation standby time of the mobile station is set to 40 ms, the base station is able to use a value resulting from subtracting a roundtrip delay or the like from 40 ms as a resource allocation standby time.

A scheduler of the base station determines whether to allocate a resource [S1706]. If the resource allocation is possible [S1707], the base station allocates the resource to the mobile station [S1708]. Otherwise, the base station checks whether the timer expires [S1709]. If the timer expires, the resource allocation is terminated. If the timer does not expire, it is determined again whether to allocate the resource. In particular, the base station keeps determining whether to allocate the resource until the timer is terminated.

Figure 18:
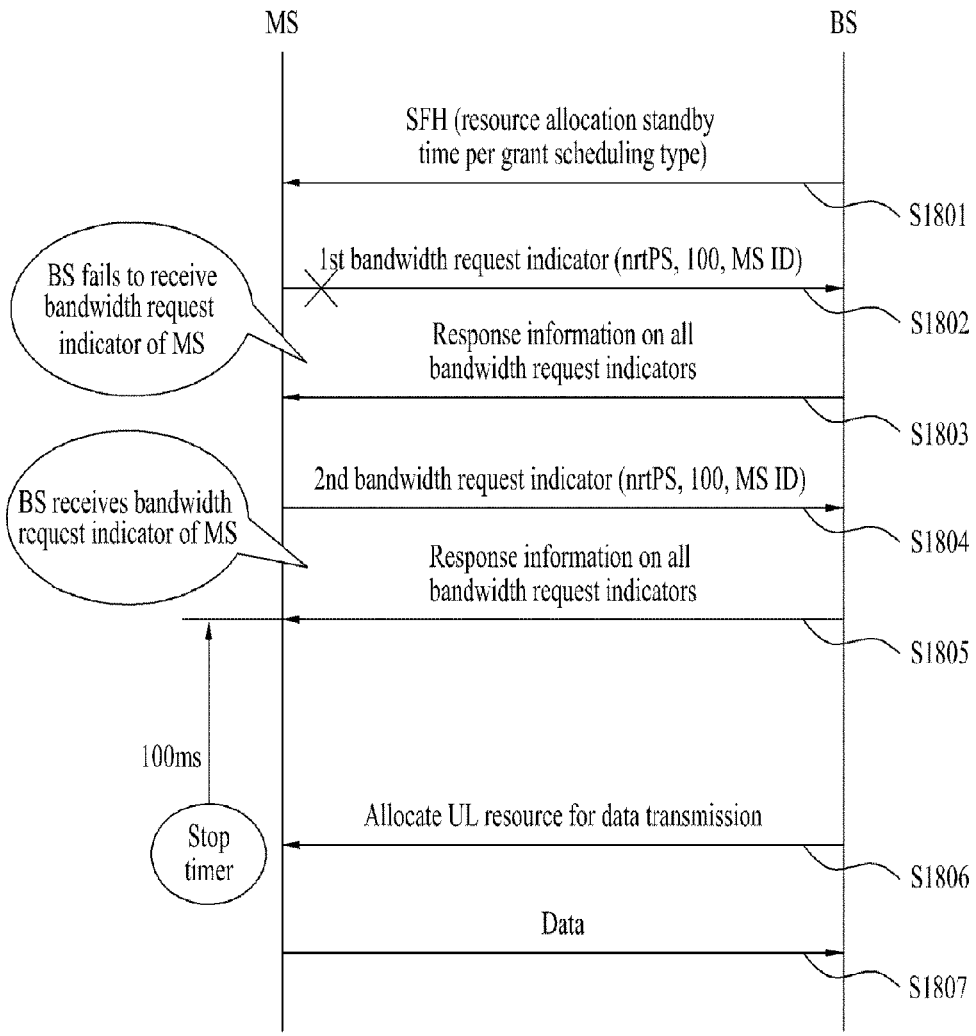
FIG. 18 is a diagram for a case of setting a timer after a mobile station has received response information in response to a bandwidth request indicator.

Now, after a mobile station has received response information for a bandwidth request indicator, a case of setting a timer is explained with reference to FIG. 18 as follows. FIG. 18 is a diagram for a case of setting a timer after a mobile station has received response information in response to a bandwidth request indicator.

Referring to FIG. 18, a base station broadcasts a resource allocation standby time per grand scheduling type via SFH [S1801]. A mobile station transmits a first bandwidth request indicator to the base station to transmit data having an nrtPS characteristic [S1802] and then receives response information in response to all bandwidth request indicators received by the base station [S1803]. If the transmission of the bandwidth request indicator transmitted by the mobile station fails, the mobile station transmits a second bandwidth request indicator [S1804].

The mobile station receives response information in response to all bandwidth request indicators received by the base station [S1805].

If the mobile station confirms that the transmission of the bandwidth request indicator transmitted by the mobile station is successful, the mobile station sets a time of a timer to '100 ms' that is a resource allocation standby time corresponding to nrtPS.

If a resource is allocated by the base station within 100 ms [S1806], the mobile station transmits data via the allocated resource [S1807]. If the resource is not allocated by the base station within 100 ms, the mobile station retransmits the bandwidth request indicator. In this case, it is ale to limitation on a count of the retransmission.

In the following description, a method of transmitting/receiving ACK/NACK in a wireless communication system according to an embodiment of the present invention is explained with reference to FIGS. 20 to 25. According to an embodiment of the present invention, a base station receives a bandwidth request indicator or a ranging indicator from a mobile station and then transmits acknowledgement (hereinafter abbreviated 'ACK'), for example, by which the present invention is non-limited. The present invention is applicable to a case that a base station receives a random access code and then transmits ACK in response to the received random access code.

In a method of transmitting and receiving ACK according to an embodiment of the present invention, a base station transmits ACK from one location spaced apart from another location, where the base station has received a bandwidth request indicator or a ranging indicator, by a specific value. According to this embodiment of the present invention, a interval between the location, where the base station has received a bandwidth request indicator or a ranging indicator, and a timing point of transmitting the ACK to the mobile station is named an ACK delay. In this case, the ACK delay can be defined by a unit of frame, subframe or 'ms'. Subsequently, the mobile station checks whether the ACK is received at a timing point determined by the ACK delay only.

According to an embodiment of the present invention, if a base station transmits an ACK from one location spaced apart from another location, where the base station has received a bandwidth request indicator or a ranging indicator, by an ACK delay, it is not necessary for the base station to have the bandwidth request or ranging indicator received location information included within the ACK separately. Therefore, it is able to reduce an overhead. In this case, the bandwidth request or ranging indicator received location information means information of such as a time axis for receiving the bandwidth request indicator or the ranging indicator as a superframe, a frame, a subframe and the like.

Thus, both of the base station and the mobile station should be aware of the ACK delay value. For this, the base station can inform the mobile station of the ACK delay value or a preset ACK delay value can be used.

In the following description, explained is a case that a base station informs a mobile station of an ACK delay value. First of all, a base station is able to inform a mobile station of an ACK delay value by broadcasting or unicasting.

When a base station base station informs a mobile station of an ACK delay value by broadcasting, the mobile station is informed of the ACK delay value via a secondary superframe header (hereinafter abbreviated 'S-SFH'. In doing so, the base station is able to transmit the ACK delay value to the mobile station together with parameters related to a bandwidth request via S-SFH sub-packet carrying the parameters related to the bandwidth request.

Moreover, the base station is able to transmit the ACK delay value to the mobile station together with parameters related to an initial ranging via S-SFH sub-packet carrying the parameters related to the initial ranging.

Besides, it is able to inform a mobile terminal of an ACK delay value by broadcasting on a traffic channel. A base station is able to transmit system information, which is not carried on a superframe header (hereinafter abbreviated 'SFH'), to a mobile station via a traffic channel. In doing so, an ACK delay value can be carried on the traffic channel together with the system information.

The system information, which is not carried on the SFH, includes additional broadcast information. For instance, the additional broadcast information includes handover relevant information, MIMO (multi-input multi-output) relevant information, relay relevant information, multi-carrier relevant information, femto-cell relevant information, EMBS (enhanced multicast and broadcast service) relevant information, inter-rat relevant information, neighbor advertisement relevant information, etc.

The handover relevant information includes a codebook subset for PMI (precoding matrix indicator) configuration and a codebook subset for DL MU-MIMO (downlink multi-user MIMO) subset indication.

The relay relevant information includes hop information, DL/UL (downlink/uplink) allocation, transmit/receive zone and zone type.

The multi-carrier relevant information includes carrier index, fully/partially configured carrier indication, center frequency, bandwidth information, initial access ability and guard resource information.

The EMBS relevant information includes service ID and MSCCH resource allocation information. The inter-rat relevant information includes MIH (media independent handover) capability support. And, the neighbor advertisement relevant information includes characteristics of neighbor BS (base station).

In case that a base station informs a mobile station of an ACK delay value by unicasting, it is able to deliver the ACK delay value via a MAC management message in an initial network entry process. The MAC management message includes a ranging response message, a registration response message (REG-RSP message), a SS basic capability response message (SBC-RSP message), a dynamic service addition response message (DSA-RSP message, a dynamic service change response message (DSC-RSP message), etc.

In case that a preset delay value is used between a base station and a mobile station, the base station does not perform a process for delivering an ACK delay value to the mobile station separately but transmits ACK/NACK to the mobile station at one location spaced apart from another location, where a bandwidth request indicator or a ranging indicator was received, by a preset ACK delay value.

Figure 20:
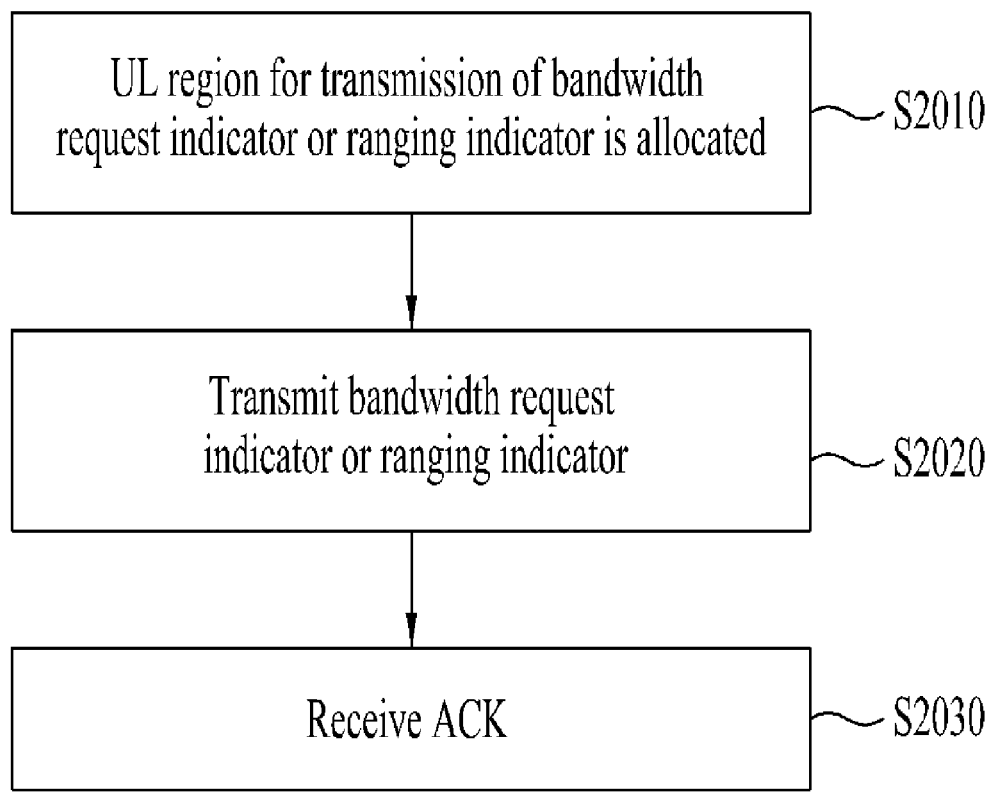
FIG. 20 is a flowchart for a method of receiving ACK/NACK in a wireless communication system according to an embodiment of the present invention.

FIG. 20 is a flowchart for a method of receiving ACK/NACK in a wireless communication system according to an embodiment of the present invention.

Referring to FIG. 20, a base station allocates an uplink (UL) region for transmitting a bandwidth request indicator or an uplink region for transmitting a ranging indicator to a mobile station [S2010]. The mobile station then transmits the bandwidth request indicator or the ranging indicator to the base station via the allocated region [S2020].

In this case, the uplink (UL) region for transmitting the bandwidth request indicator and the uplink region for transmitting the ranging indicator separately exist. Each of the uplink regions includes at least one transmission opportunity. In this case, the transmission opportunity means a resource region including at least one resource unit and can have an index.

Figure 21:
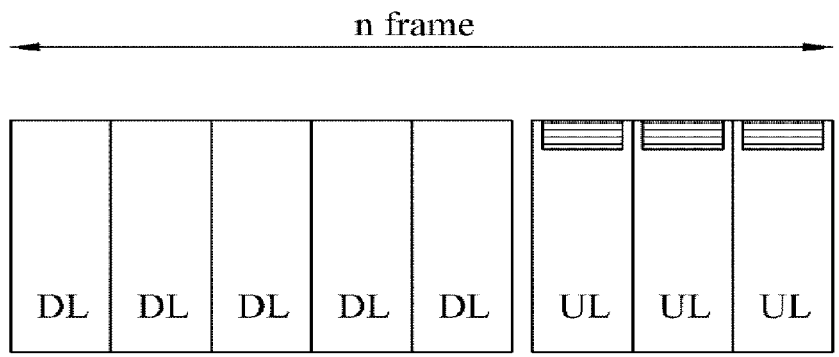
FIG. 21(a) is a diagram of a transmission opportunity set if a transmission opportunity is allocated by a subframe unit.
FIG. 21(b) is a diagram of a transmission opportunity set if a transmission opportunity is allocated by a frame unit.
Figure 21:
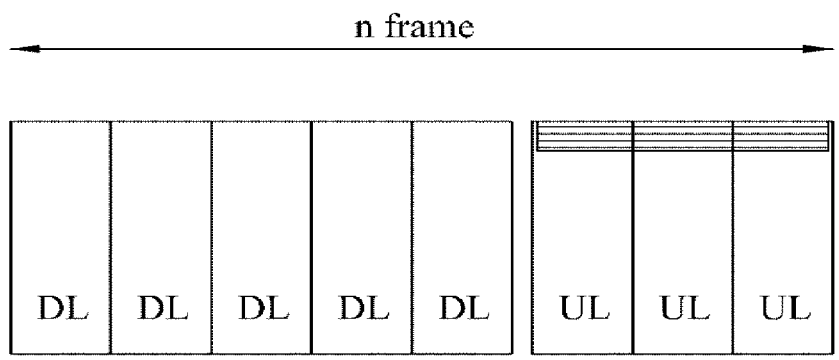
Figure 21:

FIG. 21($a$) is a diagram of a transmission opportunity set if a transmission opportunity is allocated by a subframe unit, and FIG. 21($b$) is a diagram of a transmission opportunity set if a transmission opportunity is allocated by a frame unit.

Referring to FIG. 21($a$), a transmission opportunity is assigned to a radio resource per subframe. Referring to FIG. 21($b$), transmission opportunities are assigned to a radio resource throughout a whole frame. In particular, in case that a transmission opportunity is assigned by a frame unit, one transmission opportunity can be assigned across two subframes.

Meanwhile, a base station transmits information on a transmission opportunity set to a mobile station via S-SFH.

In case that a transmission opportunity is assigned by a subframe unit, a base station transmits information on a transmission opportunity set of each subframe within four frames included in one superframe to a mobile station. The information on the transmission opportunity set of each subframe can include a frame index or bitmap, a subframe index or bitmap, a resource start offset and a transmission opportunity number.

In particular, a base station explicitly informs a mobile station of an index of a frame having a transmission opportunity assigned thereto or can transmit a frame bitmap for setting a bit position of an transmission opportunity assigned frame to '1' to a mobile station. Moreover, a base station explicitly informs a mobile station of an index of a subframe having a transmission opportunity assigned thereto or can transmit a subframe bitmap for setting a bit position of an transmission opportunity assigned frame to '1' to a mobile station. Besides, a base station is able to assign a transmission opportunity to a previously determined frame or subframe. In this case, the base station needs not to inform a mobile station of information on a transmission opportunity assigned frame or subframe.

In case that a transmission opportunity is assigned by a frame unit, a base station transmits information on a transmission opportunity set of each of four frames included in one superframe. The information on the transmission opportunity of each of the frames can include a frame index or bitmap, a resource start offset and a transmission opportunity number. In particular, the base station explicitly informs the mobile station of an index of a transmission opportunity assigned frame or can transmit a frame bit map having a bit position of a transmission opportunity assigned frame to '1' to the mobile station.

Referring now to FIG. 20, the mobile station receives the ACK/NACK from the base station via a region spaced apart from the timing point, at which the base station received the bandwidth request indicator or the ranging indicator, by the ACK delay [S2030].

The ACK delay can be defined by a subframe or frame unit. In the following description, a case of defining an ACK delay by a subframe unit and a case of defining an ACK delay by a frame unit in case of assigning a transmission opportunity by a subframe unit or a frame unit are explained.

First of all, in case that a transmission opportunity is assigned by a subframe unit, a case of defining an ACK delay by a subframe unit is explained with reference to FIG. 22 as follows.

Figure 22:
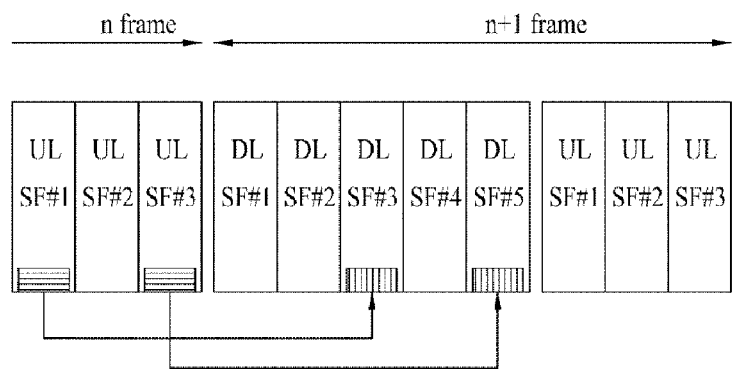
FIG. 22(a) is a diagram for an ACK transmission timing point if a transmission opportunity is assigned by a subframe unit and an ACK delay is defined by a subframe unit, when a ratio of a downlink versus an uplink is 5:3.
FIG. 22(b) is a diagram for an ACK transmission timing point if a transmission opportunity is assigned by a subframe unit and an ACK delay is defined by a subframe unit, when a ratio of a downlink versus an uplink is 4:4.
Figure 22:
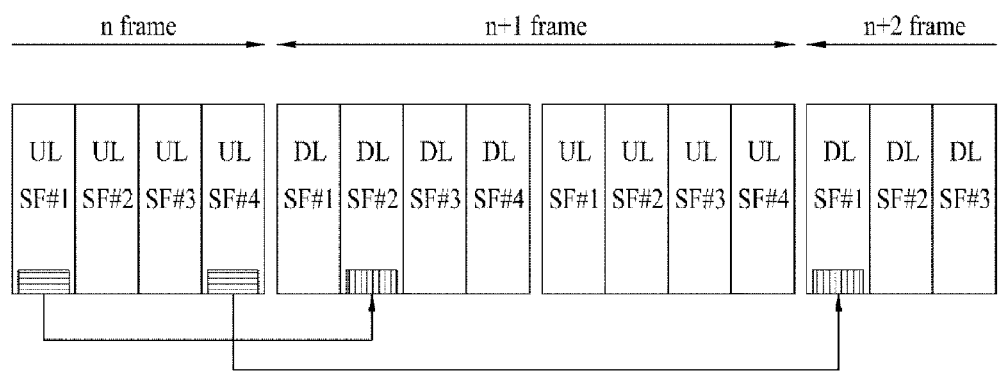
Figure 22:
Figure 22:

FIG. 22($a$) is a diagram for an ACK transmission timing point if a transmission opportunity is assigned by a subframe unit and an ACK delay is defined by a subframe unit, when a ratio of a downlink versus an uplink is 5:3. And, FIG. 22($b$) is a diagram for an ACK transmission timing point if a transmission opportunity is assigned by a subframe unit and an ACK delay is defined by a subframe unit, when a ratio of a downlink versus an uplink is 4:4.

In FIG. 22($a$) and FIG. 22($b$), shown is that an ACK delay value is 5 subframes.

Referring to FIG. 22($a$), a mobile station transmits a bandwidth request indicator or a ranging indicator in a first uplink subframe of a frame n. And, a base station transmits ACK in a third downlink subframe of a frame n+1 spaced apart from the subframe, in which the mobile station transmitted the bandwidth request indicator or the ranging indicator, by 5 subframes. Since the mobile terminal is already aware of an ACK delay value, it checks the ACK in the third downlink subframe of the frame n+1.

Referring to FIG. 22($b$), a mobile station transmits a bandwidth request indicator or a ranging indicator in a first uplink subframe of a frame n. And, a base station transmits ACK in a second downlink subframe of a frame n+1 spaced apart from the subframe, in which the mobile station transmitted the bandwidth request indicator or the ranging indicator, by 5 subframes. Since the mobile terminal is already aware of an ACK delay value, it checks the ACK in the second downlink subframe of the frame n+1.

Figure 23:
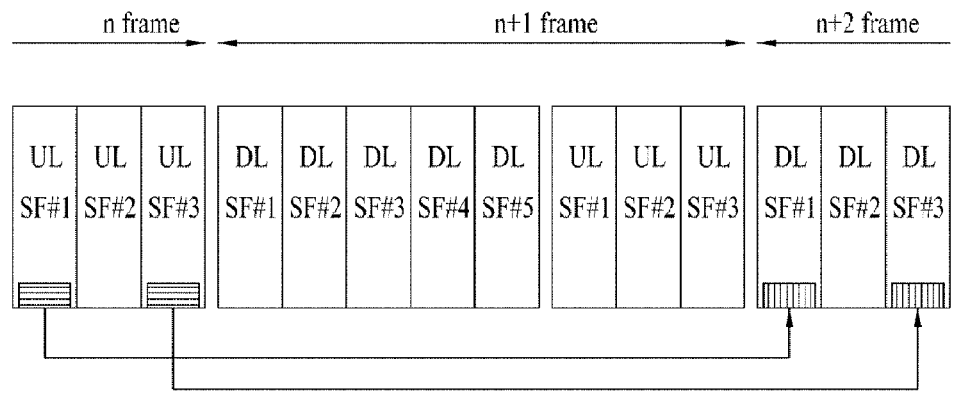
FIG. 23(a) is a diagram for an ACK transmission timing point if a transmission opportunity is assigned by a subframe unit and an ACK delay is defined by a frame unit, when a ratio of a downlink versus an uplink is 5:3.
FIG. 23(b) is a diagram for an ACK transmission timing point if a transmission opportunity is assigned by a subframe unit and an ACK delay is defined by a frame unit, when a ratio of a downlink versus an uplink is 4:4.
Figure 23:
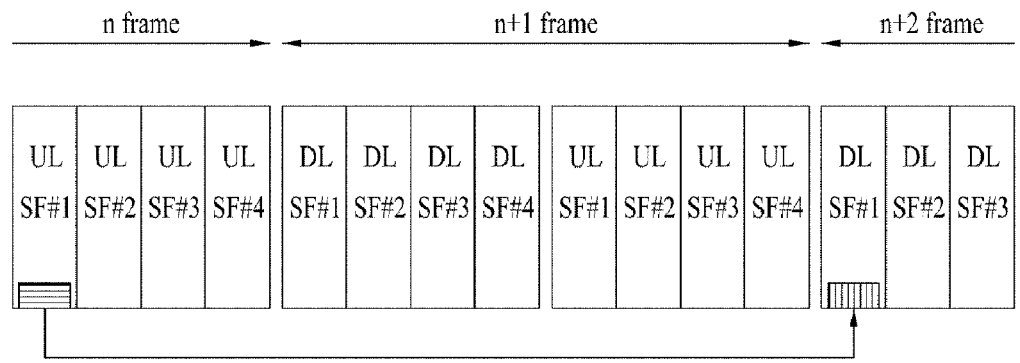

In case that a transmission opportunity is assigned by a subframe unit, a case of defining an ACK delay by a frame unit is explained with reference to FIG. 23 as follows.

FIG. 23(a) is a diagram for an ACK transmission timing point if a transmission opportunity is assigned by a subframe unit and an ACK delay is defined by a frame unit, when a ratio of a downlink versus an uplink is 5:3. And, FIG. 23(b) is a diagram for an ACK transmission timing point if a transmission opportunity is assigned by a subframe unit and an ACK delay is defined by a frame unit, when a ratio of a downlink versus an uplink is 4:4.

In FIG. 23(a) and FIG. 23(b), shown is that an ACK delay value is 2 frames.

Referring to FIG. 23(a), a mobile station transmits a bandwidth request indicator or a ranging indicator in a first uplink subframe of a frame n. And, a base station transmits ACK in a frame n+2 spaced apart from a timing point, at which the mobile station transmitted the bandwidth request indicator or the ranging indicator, by 2 frames.

In this case, the base station is able to transmit the ACK via a subframe determined according to the subframe, in which the mobile station transmitted the bandwidth request indicator or the ranging indicator, of the frame spaced apart from the frame, in which the mobile station transmitted the bandwidth request indicator or the ranging indicator, by the ACK delay value. Alternatively, the base station is able to transmit the ACK via a random subframe of the frame spaced apart from the frame, in which the mobile station transmitted the bandwidth request indicator or the ranging indicator, by the ACK delay value. For instance, if a mobile station transmits a bandwidth request indicator or a ranging indicator via a first subframe of a frame n, a base station is able to transmit ACK to the mobile station via a first subframe of a frame n+2 or a random subframe of the frame n+2.

In case that the base station transmits ACK via a subframe determined according to a subframe in which the base station received a bandwidth request indicator or a ranging indicator, the mobile station checks the corresponding subframe only. In case that the base station transmits ACK via a random subframe within a frame spaced apart from a frame, in which the base station received a bandwidth request indicator or a ranging indicator, by an ACK delay, the mobile station checks the ACK from a first subframe of a frame spaced apart from a frame, from which the bandwidth request indicator or the ranging indicator was transmitted, by the ACK delay.

Referring to FIG. 23(b), a mobile station transmits a bandwidth request indicator or a ranging indicator in a first uplink subframe of a frame n. And, a base station transmits ACK via a frame n+2 spaced apart from a timing point, at which the mobile station transmitted the bandwidth request indicator or the ranging indicator, by 2 frames.

Figure 24:
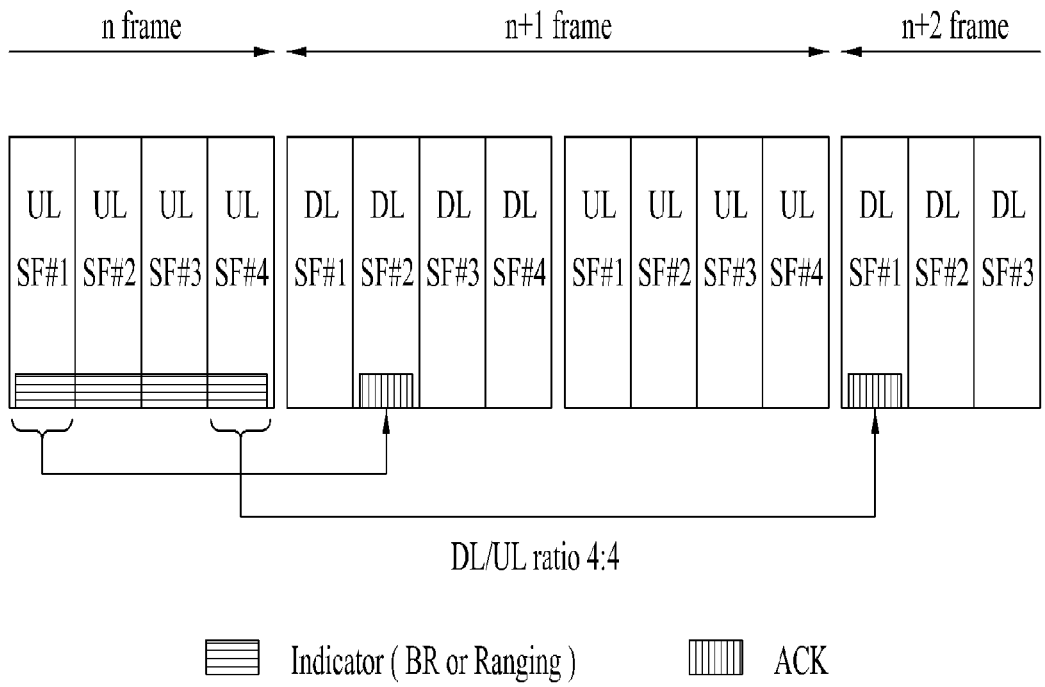
FIG. 24 is a diagram for an ACK transmission timing point if a transmission opportunity is assigned by a frame unit and an ACK delay is defined by a subframe unit, when a ratio of a downlink versus an uplink is 4:4.

In the following description, if a transmission opportunity is assigned by a frame unit, explained with reference to FIG. 24 is a case that an ACK delay is defined by a subframe unit FIG. 24 is a diagram for an ACK transmission timing point if a transmission opportunity is assigned by a frame unit and an ACK delay is defined by a subframe unit, when a ratio of a downlink versus an uplink is 4:4.

In FIG. 24, shown is that an ACK delay value is 5 subframes.

Referring to FIG. 24, a mobile station transmits a bandwidth request indicator or a ranging indicator in a first uplink subframe of a frame n. And, a base station transmits ACK in a second subframe of a frame n+1 spaced apart from a timing point, at which the mobile station transmitted the bandwidth request indicator or the ranging indicator, by 5 subframes.

Since the mobile terminal is already aware of an ACK delay value, it checks the ACK in the second downlink subframe of the frame n+1.

Figure 25:
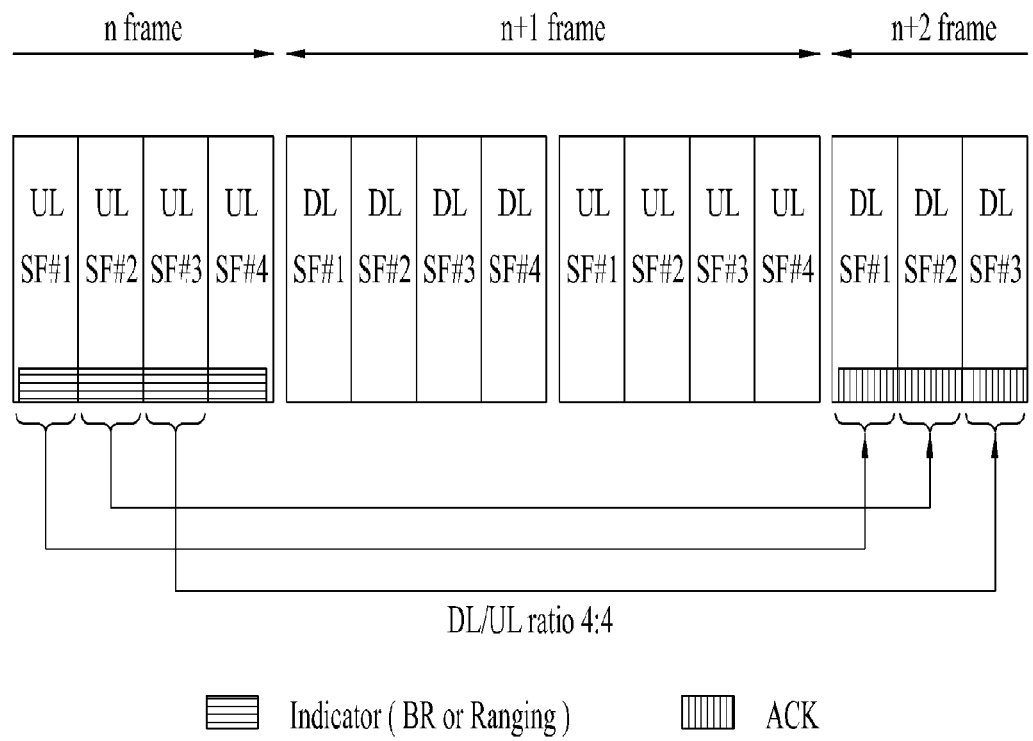
FIG. 25 is a diagram for an ACK transmission timing point if a transmission opportunity is assigned by a frame unit and an ACK delay is defined by a frame unit, when a ratio of a downlink versus an uplink is 4:4.

FIG. 25 is a diagram for an ACK transmission timing point if a transmission opportunity is assigned by a frame unit and an ACK delay is defined by a frame unit, when a ratio of a downlink versus an uplink is 4:4.

In FIG. 25, shown is that an ACK delay value is 2 frames.

Referring to FIG. 25, a mobile station transmits a bandwidth request indicator or a ranging indicator in a frame n. And, a base station transmits ACK via a frame n+2 spaced apart from a timing point, at which the mobile station transmitted the bandwidth request indicator or the ranging indicator, by 2 frames.

In this case, the base station is able to transmit the ACK via a subframe determined according to the subframe, in which the mobile station transmitted the bandwidth request indicator or the ranging indicator, of the frame spaced apart from the frame, in which the mobile station transmitted the bandwidth request indicator or the ranging indicator, by the ACK delay value. Alternatively, the base station is able to transmit the ACK via a random subframe of the frame spaced apart from the frame, in which the mobile station transmitted the bandwidth request indicator or the ranging indicator, by the ACK delay value. For instance, if a mobile station transmits a bandwidth request indicator or a ranging indicator via a first subframe of a frame n, a base station is able to transmit ACK to the mobile station via a first subframe of a frame n+2 or a random subframe of the frame n+2.

In case that the base station transmits ACK via a subframe determined according to a subframe in which the base station received a bandwidth request indicator or a ranging indicator, the mobile station checks the corresponding subframe only. In case that the base station transmits ACK via a random subframe within a frame spaced apart from a frame, in which the base station received a bandwidth request indicator or a ranging indicator, by an ACK delay, the mobile station checks the ACK from a first subframe of a frame spaced apart from a frame, from which the bandwidth request indicator or the ranging indicator was transmitted, by the ACK delay.

In case that a base station fails to detect a failure of a reception of a bandwidth request indicator or a ranging indicator at a specific timing point, the base station is able to determine whether to transmit an ACK according to the number of detected indicators. In particular, if the number of the detected indicators is small and a resource can be allocated to all indicators within a minimum timer value, the base station may not transmit the ACK. If there exist lots of detected indicators, in case that information of a resource, which is to be allocated to a plurality of indicators, is transmitted at a timing point of transmitting ACK, the base station is able to transmit the ACK.

A random access method in a wireless communication system according to an embodiment of the present invention is explained as follows.

First of all, in a random access method in a wireless communication system according to an embodiment of the present invention, a random access method of a mobile station varies according to whether a base station supports an acknowledgement (hereinafter abbreviated ACK) for a bandwidth request indicator, a quick access message or a bandwidth request message.

Therefore, it is necessary for a base station to inform a mobile station whether an ACK is supported. For this, the base station is able to inform the mobile station of a presence or non-presence of ACK support by broadcast or unicast. If a presence or non-presence of ACK support is defined in advance, the base station needs not to announce a presence or non-presence explicitly.

Figure 26:
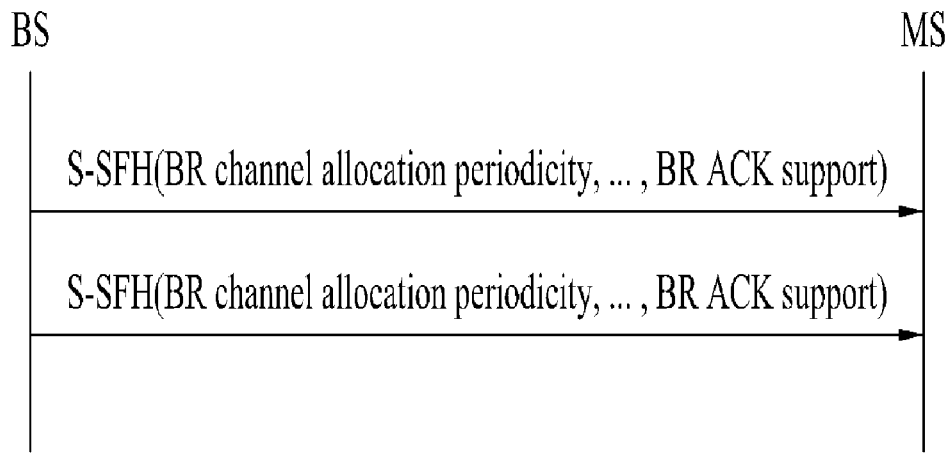
FIG. 26 is a diagram for a case that a base station informs a mobile station whether ACK is supported by broadcast.

FIG. 26 is a diagram for a case that a base station informs a mobile station whether ACK is supported by broadcast.

Referring to FIG. 26, a base station is able to inform a mobile station of a presence or non-presence of ACK support via a secondary superframe header (hereinafter abbreviated S-SFH).

A base station transmits a bandwidth request (BR) ACK support field together with parameters related to a bandwidth request. In this case, the parameters related to the bandwidth request include a bandwidth request (BR) channel allocation periodicity, a bandwidth request (BR) subframe allocation bitmap, a bandwidth request (BR) subframe allocation bitmap, a bandwidth request (BR) start offset, a bandwidth request (BR) resource frequency duration, etc.

If the bandwidth request ACK support field is set to 0b0, it means that the base station does not support the ACK. If the bandwidth request ACK support field is set to 0b1, it means that the base station supports the ACK.

Figure 27:
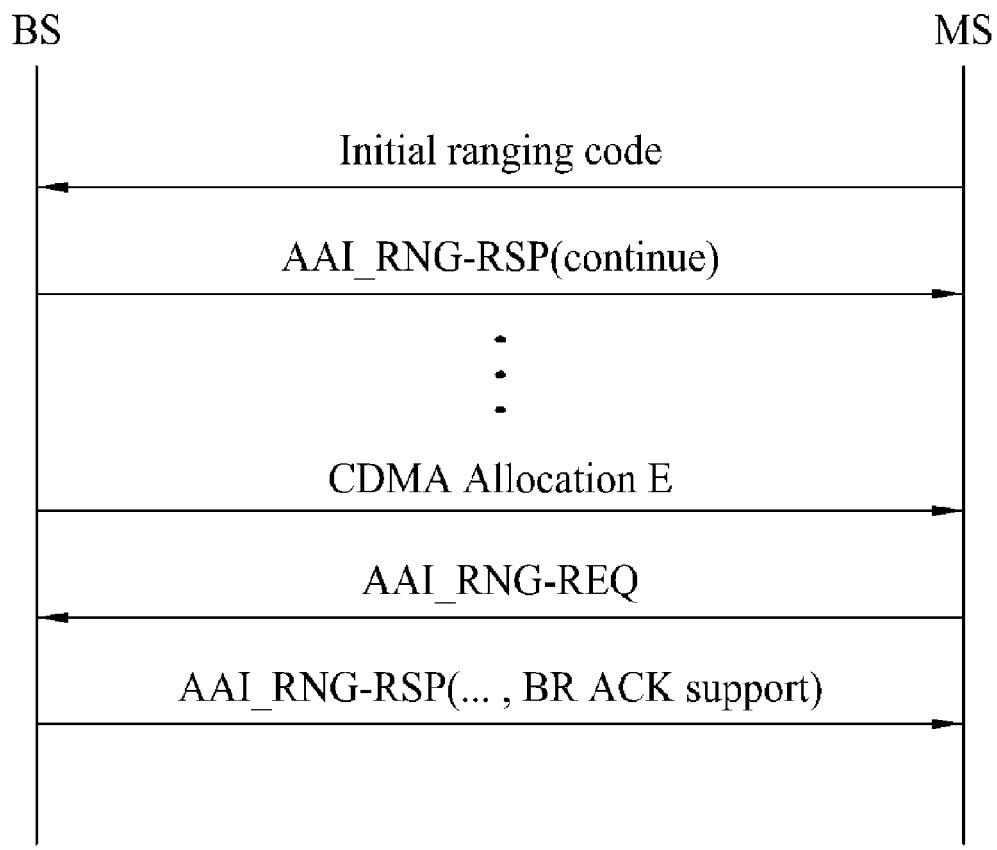
FIG. 27 is a diagram for a case that a base station informs a mobile station whether ACK is supported by unicast.

FIG. 27 is a diagram for a case that a base station informs a mobile station whether ACK is supported by unicast.

Referring to FIG. 27, a base station informs a mobile station of a presence or non-presence of ACK support via a MAC management message of a network entry process.

In particular, the base station is able to inform the mobile station of a presence or non-presence of the ACK support via an advanced air interface ranging response (hereinafter abbreviated 'AAI_RNG-RSP') message in the network entry process, an advanced air interface SS basic capability response (hereinafter abbreviated 'AAI_SBC_RSP') message, or an advanced air interface registration response (hereinafter abbreviated 'AAI_REG_RSP') message.

In case that a presence or non-presence of ACK support is announced via the AAT_RNG_RSP message, the base station receives an initial ranging code from the mobile station and then transmits the AAI_RNG-RSP message to announce a presence or non-presence of ACK support. Alternatively, the base station is able to inform the mobile station of a presence or non-presence of ACK support via the AAI_RNG-RSP message delivered in response to the AAI_RNG-REQ (advanced air interface ranging request) message of the mobile station.

If the base station supports the ACK, the base station receives a bandwidth request indicator and then transmits an AC after duration of an ACK delay. In this case, the ACK delay means an interval between a position, at which the base station receives the bandwidth request indicator, and a timing point of transmitting the ACK to the mobile station from the base station. After the base station has received the bandwidth request indicator, if the base station allocates an uplink resource to the mobile station, the base station may not transmit the ACK to the mobile station.

The ACK can be classified into an ack-based ACK, which is transmitted in case that a base station normally receives a bandwidth request indicator, and a nack-based NACK, which is transmitted in case that a base station fails to normally receive a bandwidth request indicator. In particular, the ack-based ACK is transmitted to mobile stations if a normally received code exists. Yet, the nack-based NACK is transmitted to mobile stations if a normally received code fails to exist. In this case, the ACK can be transmitted according to whether a quick access is decoded.

A random access method according to a first embodiment of the present invention is explained with reference to FIGS. 28 to 32 as follows.

According to a first embodiment of the present invention, a base station activates a timer according to an ACK of a base station and then waits for an uplink resource allocation.

First of all, in the following description, explained is a case that a mobile station transmits a bandwidth request indicator and a quick access message to a base station.

If a mobile station is explicitly or implicitly aware that a base station has successfully decoded the bandwidth request indicator and the quick access message transmitted by the mobile station, the mobile station starts a differentiated timer determined according to a characteristic of data the mobile station is going to transmit. That is, the differentiated timer is defined for a service flow between the mobile station and the base station.

The differentiated timer is determined based on such a service flow parameter as an uplink allocation scheduling type, a maximum latency and the like in a connection setting or operating process. The mobile station is able to propose a value of the differentiated timer via an advanced air interface dynamic service addition request (hereinafter abbreviated AAI_DSA-REQ) message transmitted to the base station by the mobile station. The base station is then able to check the value proposed by the mobile station or announce a substitute value, via an AAI_DSA-REQ message or an advanced air interface dynamic service addition response (hereinafter abbreviated AAI_DSA-RSP) message transmitted by the base station.

In the following description, explained is a case that a mobile station is explicitly or implicitly aware that a base station has successfully decoded a bandwidth request indicator and a quick access message transmitted by the mobile station.

There can exist the following three cases. First of all, a mobile station receives an ACK from a base station and then normally decodes the received ACK. Secondly, a mobile station receives an ACK from a base station and then fails to normally decode the received ACK. Thirdly, a base station may not transmit an ACK.

In case that a mobile station receives an ACK from a base station and then normally decodes the received ACK, if a bandwidth request indicator transmitted by the mobile station is included in the ACK and the ACK indicates that a quick access message was successfully decoded, the mobile station can be explicitly aware that the base station has successfully decoded the bandwidth request indicator and the quick access message, which had been transmitted by the mobile station.

In case that a mobile station receives an ACK from a base station and then fails to normally decode the received ACK, the mobile station is unable to recognize whether a bandwidth request indicator transmitted by the mobile station is included in the ACK. Therefore, the mobile station implicitly determines that the base station has successfully decoded the bandwidth request indicator and the quick access message, which had been transmitted by the mobile station.

In case that a base station allocates an uplink resource to every bandwidth request indicator transmitted in a transmission opportunity before an ACK delay or normally receives bandwidth request indicators and quick access messages having been transmitted in the transmission opportunity, the base station may not transmit an ACK for the corresponding transmission opportunity. Therefore, the mobile station implicitly determines that the base station has successfully decoded the bandwidth request indicator and the quick access message, which had been transmitted by the mobile station.

In case that the mobile station can be explicitly or implicitly aware that the base station has successfully decoded the bandwidth indicator and the quick access message, which has been transmitted by the mobile station, it corresponds to one of the above-described three cases. In particular, the mobile station determines that the base station has successfully decoded the bandwidth request indicator and the quick access message, which had been transmitted by the mobile station, unless explicitly receiving an ACK indicating that the bandwidth request indicator or the quick access message, which had been transmitted by the mobile station, was not received from the base station.

In case that a mobile station receives an ACK from a base station and then normally decodes the received ACK, if a bandwidth request indicator transmitted by the mobile station is included in the ACK and the ACK indicates that a quick access message was not successfully decoded, the mobile station starts a timer having a default value previously determined between the mobile station and the base station and then switches to a 5-step scheme.

In case that a mobile station receives an ACK from a base station and then normally decodes the received ACK, if a bandwidth request indicator transmitted by the mobile station is not included in the ACK, the mobile station retries a random access.

After the mobile station has started the differentiated or defaulted timer, if an uplink resource is allocated to the mobile station, the mobile station stops the corresponding timer. If the uplink resource is not allocated to the mobile station until the timer expires, the mobile station retires a random access.

In the following description, explained is a case that a mobile station transmits a bandwidth request indicator to a base station only.

First of all, after a mobile station has transmitted a bandwidth request indicator to a base station, if the mobile station explicitly or implicitly becomes aware that the base station has successfully decoded the bandwidth request indicator transmitted by the mobile station, the mobile station starts a timer of a default value. If an uplink resource for a bandwidth request message transmission is allocated to the mobile station, the mobile station stops the timer.

After a mobile station has sent a bandwidth request message to a base station, a method of operating a timer is explained as follows.

First of all, if an uplink resource for a bandwidth request message transmission is allocated to a mobile station, the mobile station sends a bandwidth request message via the allocated resource.

If the mobile station explicitly or implicitly becomes aware that the base station has successfully decoded the bandwidth request message sent by the mobile station, the mobile station starts a differentiated timer determined according to a characteristic of data to transmit. If an uplink resource is allocated to the mobile station, the mobile station stops the timer.

If the mobile station explicitly or implicitly becomes aware that the base station has successfully decoded the bandwidth request message sent by the mobile station, it means a case that the mobile station does not receive an ACK indicating that the base station fails to receive the bandwidth request message.

If the mobile station receives an ACK indicating that the base station fails to receive the bandwidth request message from the base station, the mobile station retransmits a bandwidth request indicator or a bandwidth request message.

In the following description, explained are operations of mobile and base stations in a random access method according to a first embodiment of the present invention.

Figure 28:
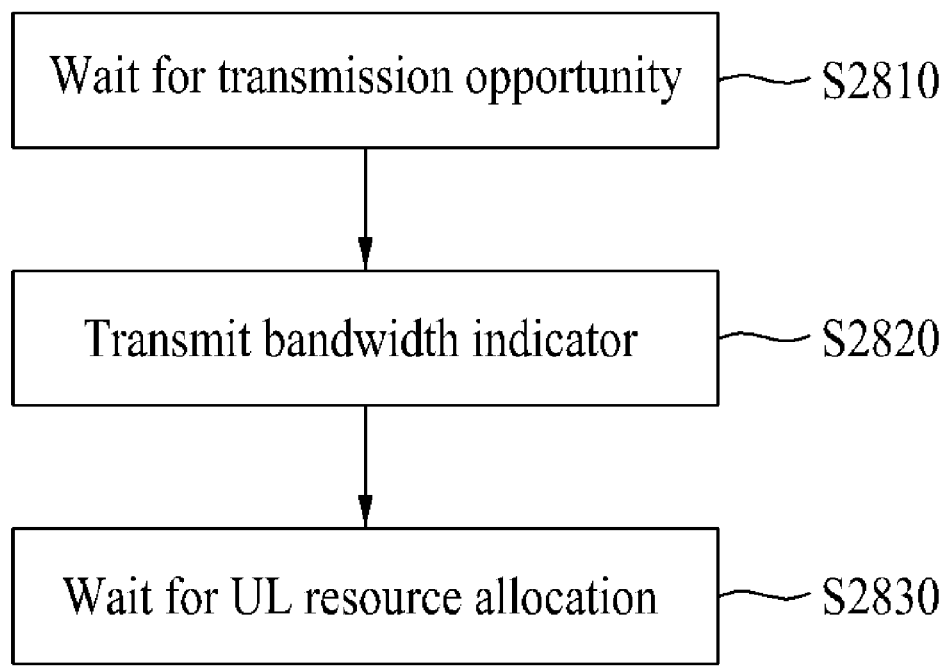
FIG. 28 is a diagram of a process for a mobile station to transmit a bandwidth request indicator according to a first embodiment of the present invention.

FIG. 28 is a diagram of a process for a mobile station to transmit a bandwidth request indicator according to a first embodiment of the present invention.

Referring to FIG. 28, a mobile station waits for a transmission opportunity, which amounts to the number selected by back-off algorithm, to transmit a bandwidth request indicator [S2810] and then transmits the bandwidth request indicator [S2820]. In doing so, in case of trying a random access by a 3-step scheme, the mobile station transmits a quick access message together with the bandwidth request indicator.

Subsequently, the mobile station waits for an uplink resource allocation [S2830]. If a base station normally receives the bandwidth request indicator only, the base station allocates an uplink resource for a bandwidth request message transmission to the mobile station via a CDMA allocation advanced-MAP information element (CDMA allocation A-MAP IE). If the base station normally receives both of the bandwidth request indicator and the quick access message, the base station allocates an uplink resource to the mobile station via an uplink (UL) basic assignment A-MAP IE.

Figure 29:
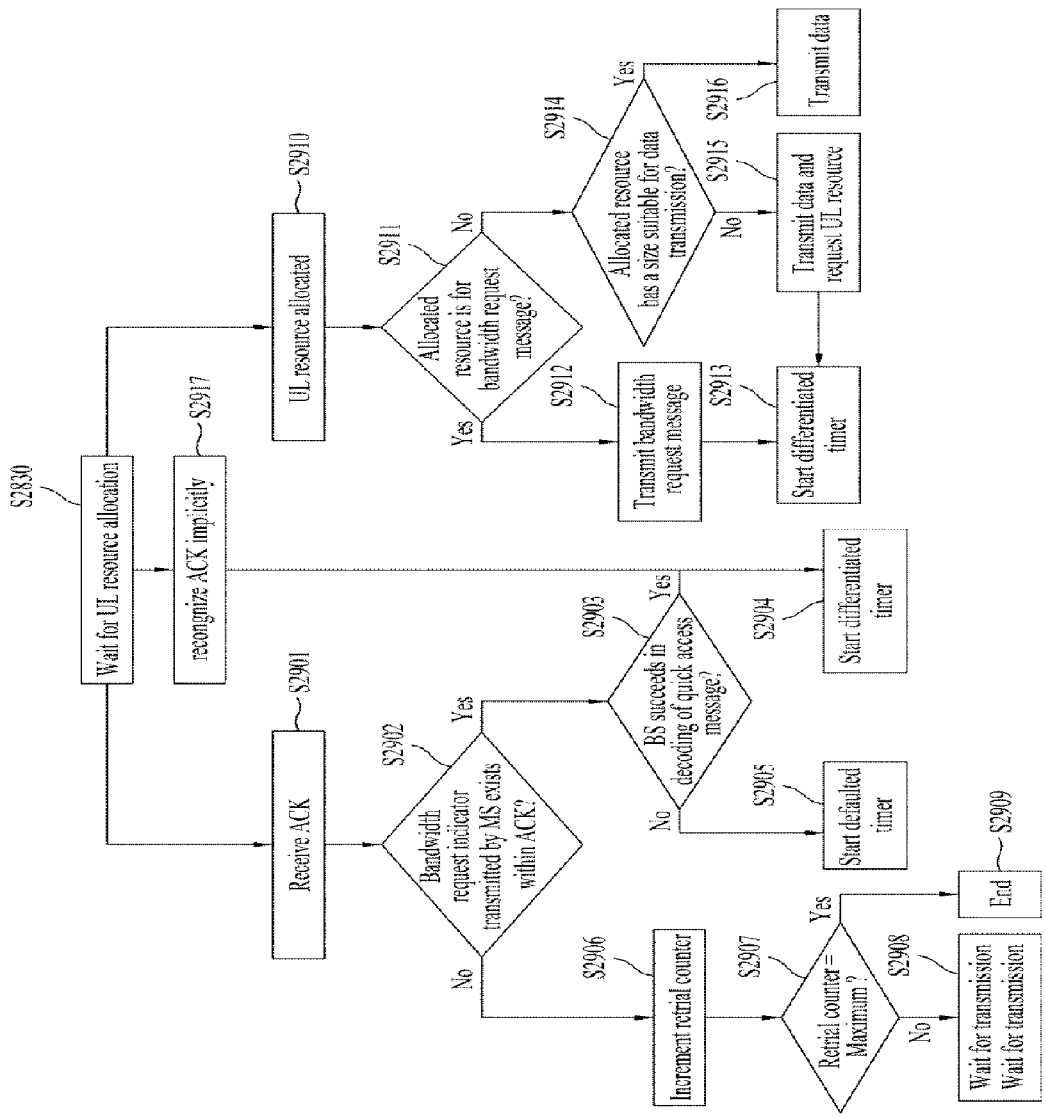
FIG. 29 and FIG. 30 are a diagram of a process for a mobile station to stand by for an uplink resource allocation according to a first embodiment of the present invention, respectively.

FIG. 29 is a diagram of a process for a mobile station to stand by for an uplink resource allocation according to a first embodiment of the present invention.

Referring to FIG. 29, a mobile station receives an ACK from a base station in the course of waiting for an uplink resource allocation [S2901]. The mobile station checks the ACK to confirm whether a bandwidth request indicator transmitted by the mobile station exists within the ACK [S2902]. If the bandwidth request indicator transmitted by the mobile station is included in the ACK, the mobile station can be explicitly or implicitly aware that the base station has successfully decoded a quick access message transmitted by the mobile station. If so, the mobile station starts a differentiated timer [S2904]. Otherwise, the mobile station starts a defaulted timer [S2905].

If the bandwidth request indicator transmitted by the mobile station is not included in the ACK, the mobile station increments a retrial counter by '1' [S2906]. If the retrial counter is set to be equal to a preset maximum value, the mobile station ends a random access process [S2909]. If the retrial counter is set to be smaller than a preset maximum value, the mobile station waits for a transmission opportunity to retry a random access [S2908].

If the mobile station fails to receive the ACK at a timing point for receiving the ACK, the mobile station implicitly determines that the base station has successfully decoded both of the bandwidth request indicator and the quick access message transmitted by the base station [S2917]. The mobile station then starts the differentiated timer [S2904].

Before the mobile station receives the ACK, if an uplink resource is allocated to the mobile station by the base station [S2910], the mobile station checks whether the allocated resource is for the bandwidth request message transmission [S2911]. If the allocated resource is for the bandwidth request message transmission, the mobile station transmits the bandwidth request message to the base station via the allocated resource [S2912] and then starts the differentiated timer [S2913]. In doing so, the differentiated timer is started after ACK/NACK for the bandwidth request message reception has been received from the base station.

If the allocated resource is for the bandwidth request message transmission, the mobile station checks whether a size of the allocated resource is suitable for a data transmission [S2914]. If it is able to transmit all data via the allocated resource, the mobile station transmits the data via the allocated resource [S2916]. If it is unable to transmit all data via the allocated resource, the mobile station makes a request for an additional uplink resource while transmitting the data via the allocated resource [S2915] and then starts the differentiated timer [S2913]. In doing so, the differentiated timer is started after ACK/NACK for the data transmission has been received from the base station.

Figure 30:
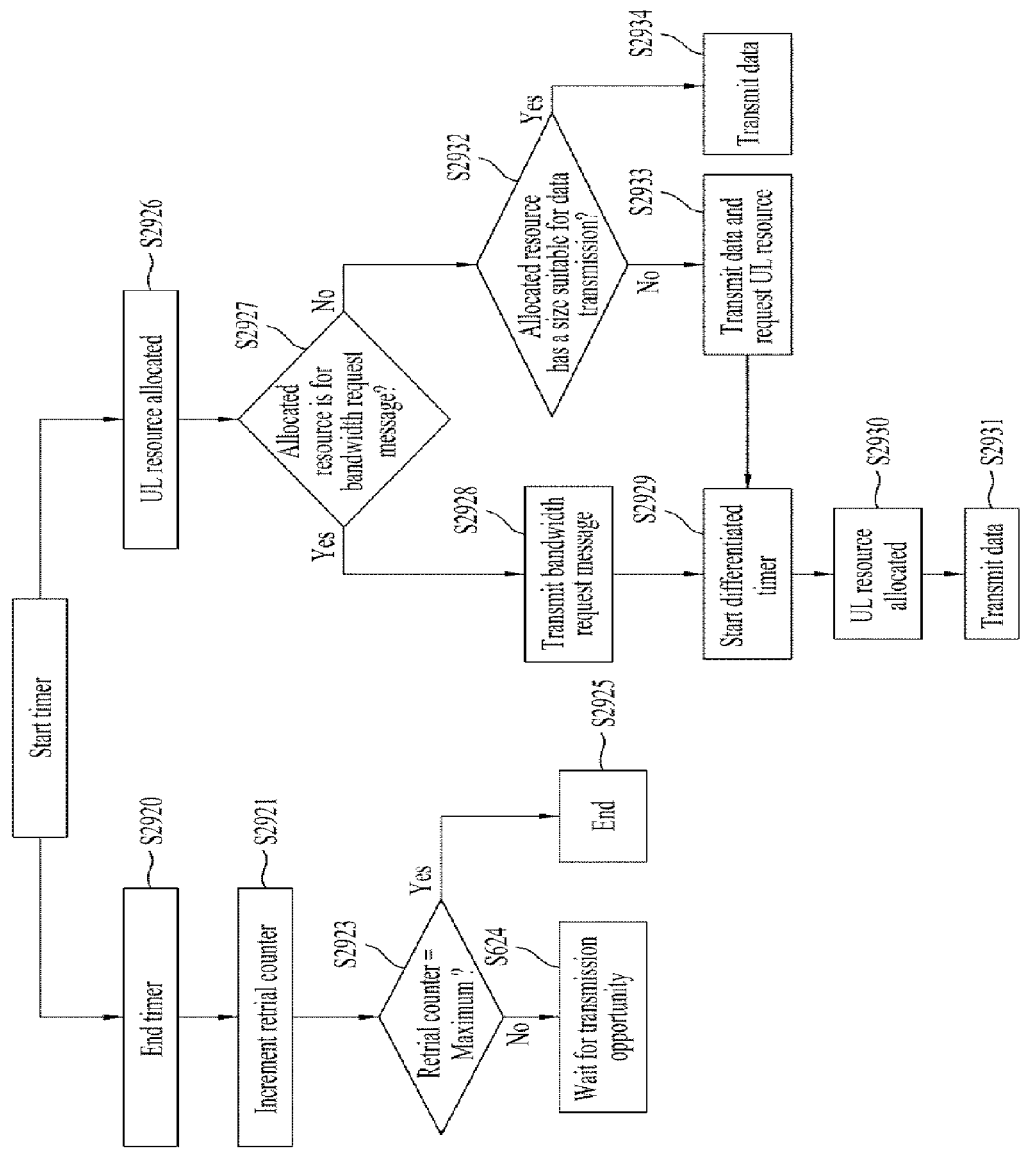

FIG. 30 is a diagram of a process for a mobile station to stand by for an uplink resource allocation after having started a timer according to a first embodiment of the present invention.

After the mobile station has started the defaulted timer or the differentiated timer [S2905 or S2904, S2913], the timer may expire without the uplink resource allocation [S2920]. If so, the mobile station increments the retrial counter by '1' [S2921]. If the retrial counter is set to be equal to a preset maximum value, the mobile station ends the random access process [S2925]. If the retrial counter is set to be smaller than the preset maximum value, the mobile station waits for a transmission opportunity to retry the random access [S2924].

After the mobile station has started the defaulted timer or the differentiated timer [S2905 or S2904, S2913], if an uplink resource is allocated before the timer expires [S2926], the mobile station checks whether the allocated resource is for the bandwidth request message transmission [S2927]. If the allocated resource is for the bandwidth request message transmission, the mobile station transmits the bandwidth request message to the base station via the allocated resource [S2928] and then starts the differentiated timer [S2929]. In doing so, the differentiated timer is started after ACK/NACK for the bandwidth request message reception has been received from the base station. If an uplink resource for the data transmission is allocated [S230], the mobile station transmits the data [S2931].

If the allocated resource is for the bandwidth request message transmission, the mobile station checks whether a size of the allocated resource is suitable for a data transmission [S2932]. If it is able to transmit all data via the allocated resource, the mobile station transmits the data via the allocated resource [S2934]. If it is unable to transmit all data via the allocated resource, the mobile station makes a request for an additional uplink resource while transmitting the data via the allocated resource [S2933] and then starts the differentiated timer [S2929]. In doing so, the differentiated timer is started after ACK/NACK for the data transmission has been received from the base station.

Figure 31:
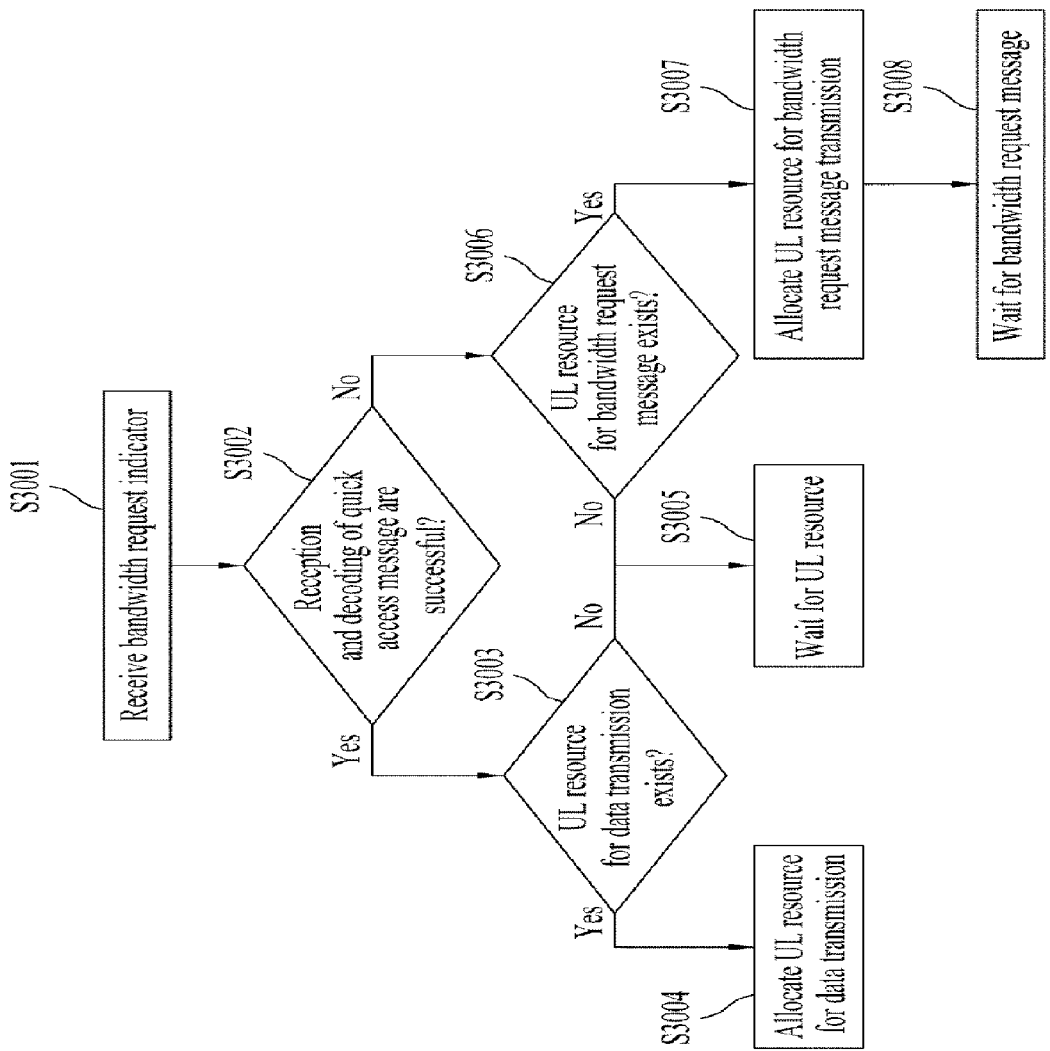
FIG. 31 is a diagram of a process for receiving a bandwidth request indicator in a base station according to a first embodiment of the present invention.

FIG. 31 is a diagram of a process for receiving a bandwidth request indicator in a base station according to a first embodiment of the present invention.

Referring to FIG. 31, a base station receives a bandwidth request indicator [S3001]. The base station waits for a bandwidth request indicator each transmission opportunity. If the base station normally detects the bandwidth request indicator at the transmission opportunity, the base station performs another process according to whether a quick access message is normally received.

The mobile station transmits the bandwidth request indicator only or can transmit both of the bandwidth request indicator and the quick access message. If the mobile station transmits both of the bandwidth request indicator and the quick access message, the base station may be able to decode the quick access message successfully or unsuccessfully.

If the base station receives the quick access message and then successfully decodes the received quick access message, the base station checks whether there is an uplink resource amounting to a size requested by the mobile station [S3003]. If there is the uplink resource, the base station allocates the uplink resource to the mobile station [S3004]. Otherwise, the base station stands by for an uplink resource [S3005].

If the mobile station does not transmit the quick access message or the base station fails to successfully receive and decode the quick access message, the base station checks whether an uplink resource for a bandwidth request message transmission can be allocated to the mobile station [S3006]. If there is the uplink resource, the base station allocates the uplink resource to the mobile station [S3007] and then waits for the bandwidth request message [S3008]. Otherwise, the base station stands by for an uplink resource [S3005].

Figure 32:
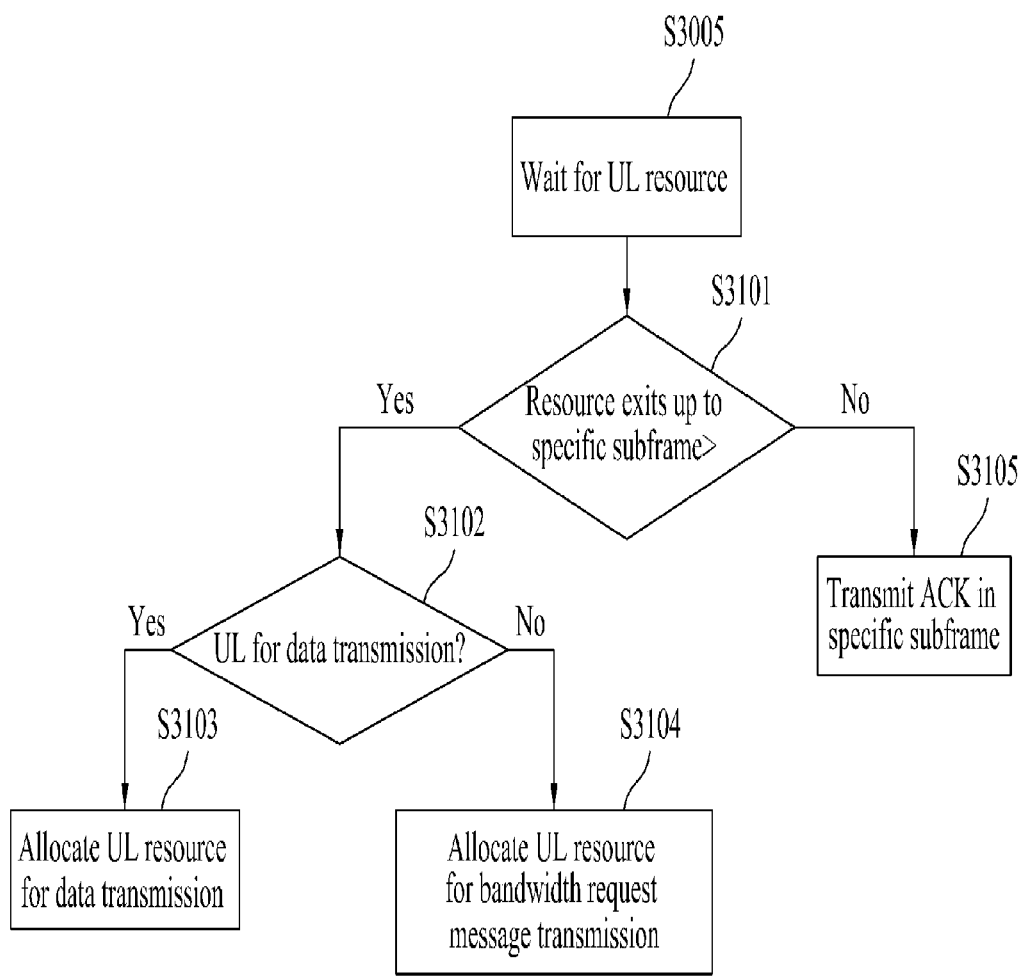
FIG. 32 is a diagram of a process for a base station to re-obtain whether a resource for allocation exists according to a first embodiment of the present invention.

FIG. 32 is a diagram of a process for a base station to re-obtain whether a resource for allocation exists according to a first embodiment of the present invention.

Referring to FIG. 32, if an uplink resource to be allocated to a mobile station exists before a subframe for transmitting an ACK, a base station allocates an uplink resource for a data transmission to the mobile station [S3103] or allocates an uplink resource for a bandwidth request message transmission [S3104].

If an uplink resource to be allocated to a mobile station does not exist before a subframe for transmitting an ACK, the base station transmits an AC to the mobile station in the subframe for transmitting the ACK [S3105] and then waits for an uplink resource to allocate to the mobile station again.

Figure 33:
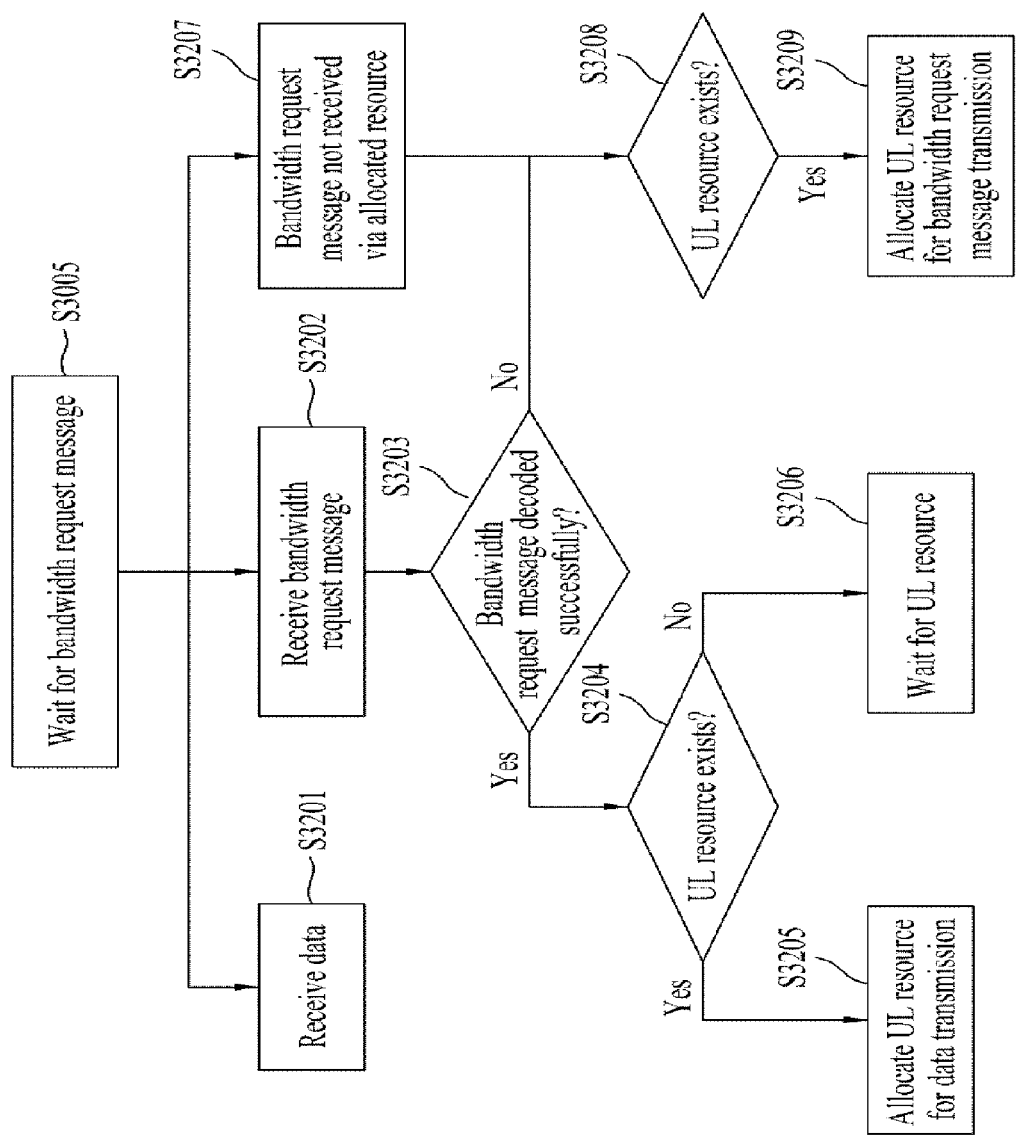
FIG. 33 is a diagram for a base station to receive a bandwidth request message according to a first embodiment of the present invention.

FIG. 33 is a diagram for a base station to receive a bandwidth request message according to a first embodiment of the present invention.

First of all, if a mobile station obtains an uplink resource enough to send a bandwidth request message, the mobile station is able to sent the bandwidth request message or data except the bandwidth request message.

Referring to FIG. 33, a base station receives data [S3201] or receives a bandwidth request message [S3202]. Having received the bandwidth request message, the base station decodes the bandwidth request message [S3203]. If the decoding is successful, the base station checks whether an uplink resource amounting to a size requested by a mobile station can be allocated [S3204].

If the uplink resource exists, the base station allocates the uplink resource to the mobile station [S3205]. Otherwise, the base station waits for an uplink resource [S3206].

If the base station fails to receive the bandwidth request message in the resource allocated to the mobile station for a transmission of the bandwidth request message [S3209] or fails to decode the bandwidth request message, the base station checks whether an uplink resource for the bandwidth request message transmission exists to be allocated to the mobile station [S3208]. If the resource exits to be allocated, the base station allocates the uplink resource for the bandwidth request message transmission [S3209]. In doing so, the base station informs the mobile station that the bandwidth request message was not received or decoded successfully.

A random access method according to a second embodiment of the present invention is explained as follows.

According to a second embodiment of the present invention, a mobile station activates a timer at a timing point of sending a bandwidth request indicator or a bandwidth request message.

In the following description, explained is a case that a base station supports an ACK and that a mobile station transmits a bandwidth request indicator and a quick access message to the base station.

First of all, a mobile station transmits a bandwidth request indicator and a quick access message to a base station and then starts a differentiated timer determined according to a characteristic of data to transmit.

Subsequently, if a code sent by the mobile station is included in an ACK received from the base station and if the mobile station is explicitly or implicitly aware that the base station has successfully decoded the quick access message, the mobile station keeps operating the timer.

If a code sent by the mobile station is included in an ACK received from the base station and if it is indicated that the base station has failed in decoding of the quick access message, the mobile station stops the timer and starts a defaulted timer.

If a code sent by the mobile station is not included in an ACK received from the base station, the mobile station stops the timer.

If an uplink resource is allocated, the mobile station stops the timer.

In the following description, explained is a case that a base station supports an ACK and that a mobile station transmits a bandwidth request indicator to the base station.

First of all, a mobile station transmits a bandwidth request indicator to a base station and then starts a timer having a default value. In this case, the default value can be previously defined in a manner of being determined in consideration of a maximum scheduling delay for allocating an uplink resource for transmitting a bandwidth request message. For instance, if frame information can be represented as maximum 24 frames within CDMA Allocation A-MAP IE, it is able to define a default value set equal to or smaller than 24 frames. In this case, the default value can be defined in consideration of a time between a timing point of transmitting a bandwidth request indicator and a quick access message and a timing point of receiving an ACK.

If the mobile terminal can be explicitly or implicitly aware that the base station has successfully received the bandwidth request message via the ACK received from the base station, the mobile station keeps the timer. Otherwise, the mobile station stops the timer.

If an uplink resource is allocated, the mobile station stops the timer.

In the following description, explained is a case that a base station does not support an ACK and that a mobile station sends a bandwidth request message to the base station.

First of all, a mobile station transmits a bandwidth request message to a base station and then starts a differentiated timer determined according to a characteristic of data to transmit.

If the base station announces that decoding of the bandwidth request message sent by the mobile station was successful, the mobile station keeps operating the timer. If the base station announces that decoding of the bandwidth request message sent by the mobile station was not successful, the mobile station stops the timer. Subsequently, the mobile station retransmits the bandwidth request message or a bandwidth request indicator according to a presence or non-presence of reallocation by the base station.

If an uplink resource is allocated to the mobile station, the mobile station stops the timer.

In the following description, explained is a case that a base station does not support an ACK and that a mobile station transmits a bandwidth request indicator and a quick access message to the base station.

First of all, a mobile station transmits a bandwidth request indicator and a quick access message to a base station and then starts a differentiated timer determined according to a characteristic of data to transmit.

If the base station successfully decodes the bandwidth request indicator received from the mobile station but fails the decoding of the quick access message, the base station allocates an uplink resource for a bandwidth request message transmission within a default value or is able to allocate an uplink resource for a bandwidth request message transmission within a minimum value of the differentiated timer values.

If the uplink resource for the bandwidth request message transmission is allocated to the mobile station, the mobile station stops the timer.

In case that the base station allocates the uplink resource for the bandwidth request message transmission within the default value, after the mobile station has transmitted the bandwidth request indicator and the quick access message, if a value of the started differentiated timer is smaller than the default value, it may happen that the mobile station retransmits the bandwidth request indicator.

Figure 34:
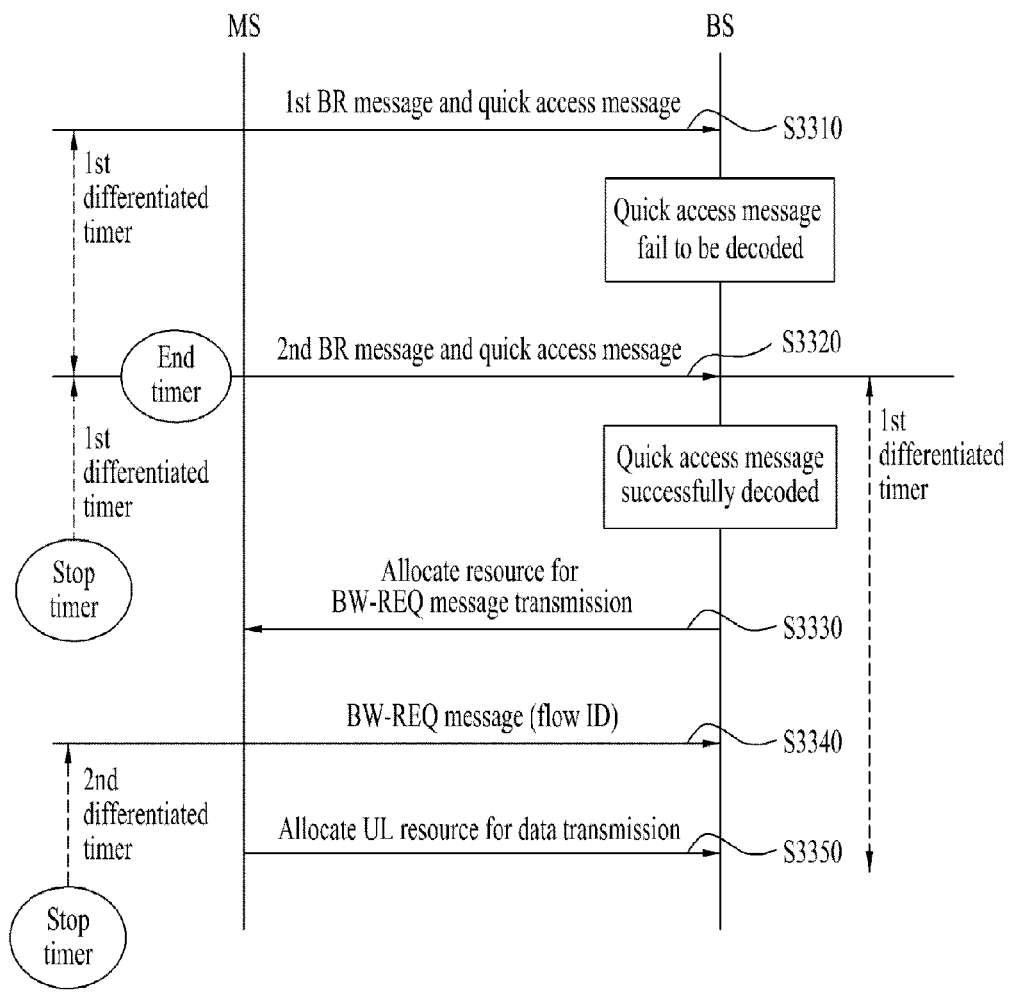
FIG. 34 is a diagram for a case that a mobile station retransmits a bandwidth request indicator.

FIG. 34 is a diagram for a case that a mobile station retransmits a bandwidth request indicator.

Referring to FIG. 33, a mobile station transmits a first bandwidth request indicator and a quick access message [S3310] and then starts a first differentiated timer. Yet, if the base station successfully receives and decodes the bandwidth request indicator but fails the decoding of the quick access message, the base station allocates an uplink resource for a bandwidth request message transmission within a default value.

If a value of the differentiated timer is smaller than the default value, the timer expires before an uplink resource is allocated to the mobile station. Subsequently, the mobile terminal transmits a second bandwidth request indicator and a quick access message to the base station to retry a random access of the mobile station [S3320].

Subsequently, the base station receives the second bandwidth request indicator and the quick access message and then successfully decodes them. The base station allocates an uplink resource for the first bandwidth request indicator [S3330]. If so, the mobile station stops the timer and then sends a bandwidth request message [S3340]. The base station then compares a flow ID of the bandwidth request message with a flow ID of the quick access message transmitted together with the second bandwidth request indicator. If the flow IDs match each other, the base station allocates an uplink resource having a size requested via the bandwidth request message [S3350]. In this case, after the mobile station has transmitted the second bandwidth request indicator, the base station allocates the uplink resource within the started timer.

Embodiments of the present invention can be implemented using various means. For instance, embodiments of the present invention can be implemented using hardware, firmware, software and/or any combinations thereof.

In the implementation by hardware, a random access method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means well-known to the public.

INDUSTRIAL APPLICABILITY

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

And, it is apparent that claims not in the explicitly cited relation can be combined to configure a new embodiment or can be included as new claims by correction after application.

The invention claimed is:

1. A contention-based random access resource request method of a mobile station in a wireless communication system, the method comprising:
    transmitting a bandwidth request sequence and a quick access message for an uplink resource request to a base station;
    receiving an acknowledgement from the base station indicating whether the bandwidth request sequence and the quick access message have been received by the base station;
    starting a timer having a differentiated value if the acknowledgement indicates that the base station has successfully received the bandwidth request sequence and the quick access message and starting a timer having a fixed value if the acknowledgement indicates that the base station has successfully received the bandwidth request sequence but has failed to successfully receive the quick access message;
    transmitting an advanced air interface dynamic service addition request (AAI_DSA-REQ) message to the base station, the AAI_DSA-REQ message including a proposed value for the differentiated value; and
    receiving an advanced air interface dynamic service addition response (AAI_DSA-RSP) message from the base station, the AAI_DSA-RSP message including a confirmed value for the differentiated value or a substituted value for the-differentiated value.

2. The method according to claim 1, further comprising stopping the timer having the differentiated value if an uplink resource is allocated by the base station before the timer having the differentiated value expires.

3. The method according to claim 1, further comprising retransmitting the bandwidth request sequence and the quick access message to the base station if an uplink resource is not allocated by the base station before the timer having the differentiated value expires.

4. The method according to claim 1, further comprising:
    stopping the timer having the fixed value if an uplink resource is allocated by the base station before the timer having the fixed value expires; and
    transmitting a bandwidth request message to the base station via the allocated uplink resource and starting the timer having the differentiated value.

5. The method according to claim 1, wherein the timer having the differentiated value is determined based on an uplink allocation scheduling type and a maximum latency.

6. The method according to claim 1, further comprising receiving an AAI_DSA-REQ message from the base station, the AAI_DSA-REQ message including a value for the timer having the differentiated value.

7. A mobile station comprising:
    a transmitter configured to transmit a bandwidth request sequence and a quick access message for an uplink resource request to a base station;
    a receiver configured to receive an acknowledgement from the base station indicating whether the bandwidth request sequence and the quick access message have been received by the base station;
    a processor configured to start a timer having a differentiated value if the acknowledgement indicates that the base station has successfully received the bandwidth request sequence and the quick access message and to start a timer having a fixed value if the acknowledgement indicates that the base station has successfully received the bandwidth request sequence but has failed to successfully receive the quick access message,
    wherein the transmitter is further configured to transmit an advanced air interface dynamic service addition request (AAI_DSA-REQ) message to the base station, the AAI_DSA-REQ message including a proposed value for the differentiated value, and
    wherein the receiver is further configured to receive an advanced air interface dynamic service addition response (AAI_DSA-RSP) message from the base station, the AAI_DSA-RSP message including a confirmed value for the differentiated value or a substituted value for the differentiated value.

8. The mobile station according to claim 7, wherein the mobile station stops the timer having the differentiated value if an uplink resource is allocated by the base station before the timer having the differentiated value expires.

9. The mobile station according to claim 7, wherein the mobile station retransmits the bandwidth request sequence and the quick access message to the base station if an uplink resource is not allocated by the base station before the timer having the differentiated value expires.

10. The mobile station according to claim 7, wherein the mobile station stops the timer having the fixed value if an uplink resource is allocated by the base station before the timer having the fixed value expires, and transmits a bandwidth request message to the base station via the allocated uplink resource and starts the timer having the differentiated value.

11. The mobile station according to claim 7, wherein the timer having the differentiated value is determined based on an uplink allocation scheduling type and a maximum latency.

12. The mobile station according to claim 7, wherein the receiver is further configured to receive an AAI_DSA-REQ message from the base station, the AAI_DSA-REQ message including a value for the timer having the differentiated value.

* * * * *